US 9,524,732 B2

(12) United States Patent
Kawashima et al.

(10) Patent No.: US 9,524,732 B2
(45) Date of Patent: Dec. 20, 2016

(54) COMMUNICATION SUPPORT DEVICE AND COMMUNICATION SUPPORT METHOD

(71) Applicant: FUJITSU LIMITED, Kawasaki-shi, Kanagawa (JP)

(72) Inventors: Naoto Kawashima, Yokohama (JP); Naoto Matsudaira, Yokohama (JP); Yuusuke Tounai, Yokohama (JP); Hiroshi Yoshida, Yokohama (JP); Shingo Hirono, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 109 days.

(21) Appl. No.: 14/015,207

(22) Filed: Aug. 30, 2013

(65) Prior Publication Data
US 2014/0081639 A1 Mar. 20, 2014

Related U.S. Application Data

(63) Continuation of application No. PCT/JP2011/055422, filed on Mar. 8, 2011.

(51) Int. Cl.
*G10L 15/00* (2013.01)
*G10L 21/16* (2013.01)
(Continued)

(52) U.S. Cl.
CPC ............ *G10L 21/16* (2013.01); *G10L 25/48* (2013.01); *H04M 3/51* (2013.01); *G10L 15/30* (2013.01);
(Continued)

(58) Field of Classification Search
USPC .................................. 704/246–252
See application file for complete search history.

(56) References Cited

U.S. PATENT DOCUMENTS 7,023,979 B1\* 4/2006 Wu et al. ............... 379/265.11
8,054,964 B2\* 11/2011 Flockhart ............... G10L 17/26
379/265.07
(Continued)

FOREIGN PATENT DOCUMENTS

JP 5-219159 8/1993
JP 6-37895 2/1994
(Continued)

OTHER PUBLICATIONS

PCT International Preliminary Report on Patentability issued Sep. 10, 2013 in corresponding International Application No. PCT/JP2011/055422.

(Continued)

*Primary Examiner* — Leonard Saint Cyr
(74) *Attorney, Agent, or Firm* — Staas & Halsey LLP

(57) ABSTRACT

The communication support device includes: a storing unit configured to store an utterance of a first speaker transmitted from a first terminal as utterance information; an analyzing unit configured to obtain a holding notice which sets communications with the first terminal to a holding state, the communications being transmitted from a second terminal used by a second speaker who communicates with the first speaker, and to analyze features of utterance information which correspond to a time of a holding state; and an instructing unit configured to output to the second terminal determination information on the first speaker based on the features of the utterance information of the first speaker.

10 Claims, 23 Drawing Sheets

(51) Int. Cl.
*G10L 25/48* (2013.01)
*H04M 3/51* (2006.01)
*G10L 15/30* (2013.01)
*G10L 15/08* (2006.01)
*G10L 25/63* (2013.01)

(52) U.S. Cl.
CPC .......... *G10L 25/63* (2013.01); *G10L 2015/088* (2013.01); *H04M 2201/40* (2013.01); *H04M 2203/352* (2013.01); *H04M 2203/401* (2013.01)

(56) References Cited

U.S. PATENT DOCUMENTS

| | | | |
|---|---|---|---|
| 8,774,774 B2* | 7/2014 | Lee | H04W 4/16 370/352 |
| 2002/0016783 A1 | 2/2002 | Kayaba et al. | |
| 2006/0106612 A1* | 5/2006 | Surace et al. | 704/270 |
| 2006/0265089 A1* | 11/2006 | Conway et al. | 700/94 |
| 2007/0071206 A1* | 3/2007 | Gainsboro et al. | 379/168 |
| 2007/0270664 A1* | 11/2007 | Ishii et al. | 600/300 |
| 2008/0240404 A1* | 10/2008 | Conway et al. | 379/265.06 |
| 2009/0021574 A1* | 1/2009 | Iwami | 348/14.04 |
| 2009/0103698 A1* | 4/2009 | Conway et al. | 379/106.03 |
| 2010/0049520 A1* | 2/2010 | Stewart et al. | 704/257 |
| 2010/0278318 A1* | 11/2010 | Flockhart | G10L 17/26 379/88.04 |

FOREIGN PATENT DOCUMENTS

| | | |
|---|---|---|
| JP | 9-200340 | 7/1997 |
| JP | 2000-83098 | 3/2000 |
| JP | 2002-51153 | 2/2002 |
| JP | 2005-142897 | 6/2005 |
| JP | 3857922 | 9/2006 |
| JP | 2008-53826 | 3/2008 |
| JP | 2008-219741 | 9/2008 |
| JP | 2009-182433 | 8/2009 |

OTHER PUBLICATIONS

PCT International Preliminary Report on Patentability issued Nov. 20, 2013 in corresponding International Application No. PCT/JP2011/055422.
Office Action mailed Jun. 10, 2014 in corresponding Japanese Patent Application No. 2013-503287.
International Search Report mailed May 17, 2011 for corresponding International Application No. PCT/JP2011/055422.
Chinese Office Action issued Dec. 9, 2014 in corresponding Chinese Patent Application No. 201180068820.9.

* cited by examiner

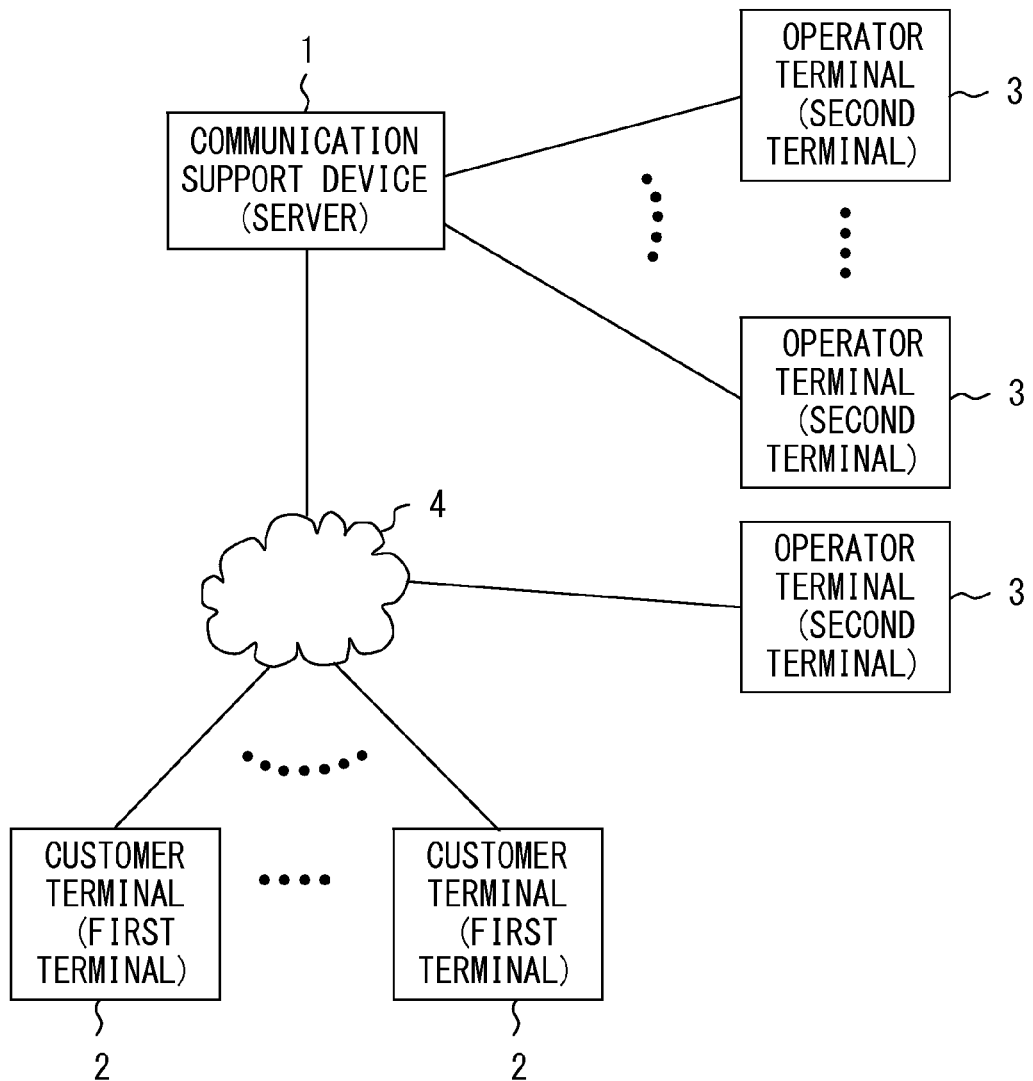
F I G. 1

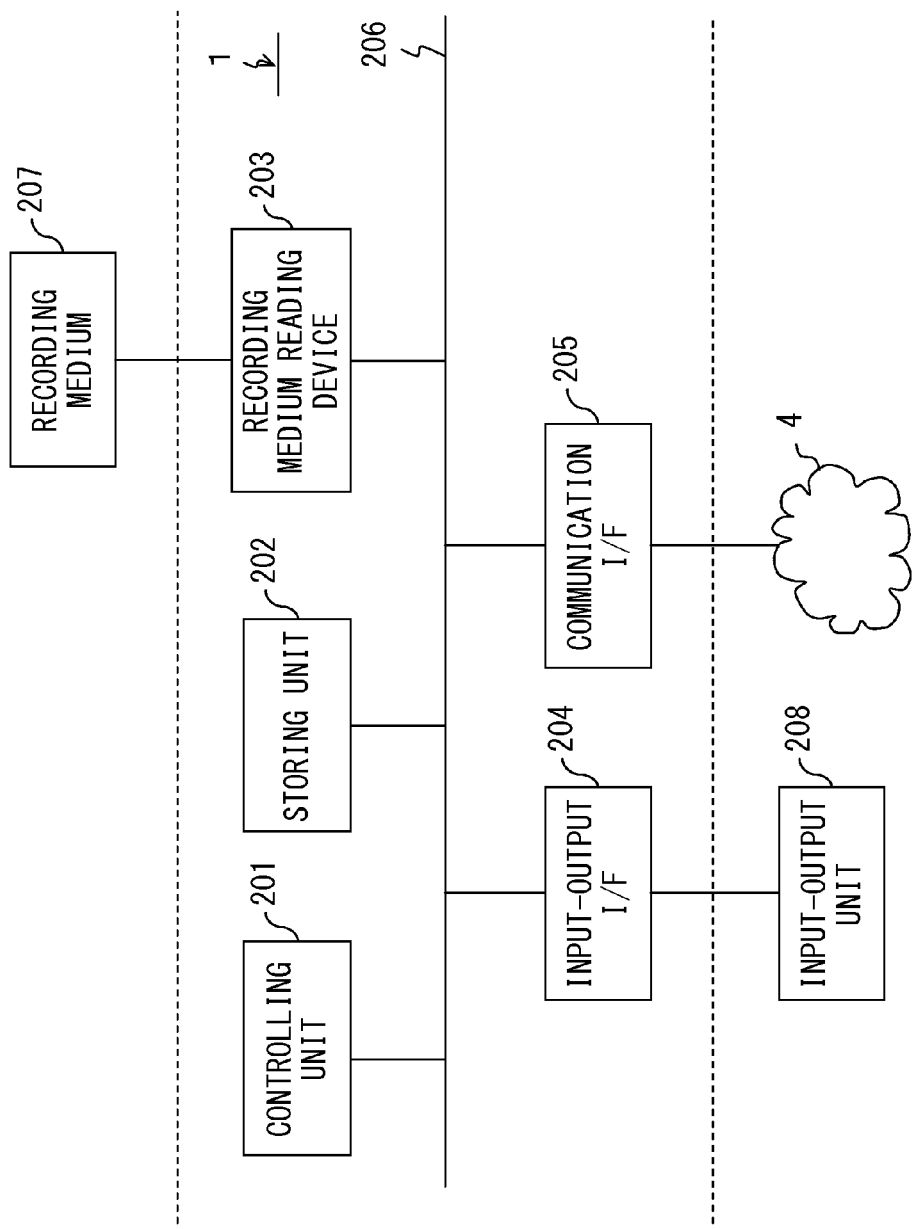
F I G. 2

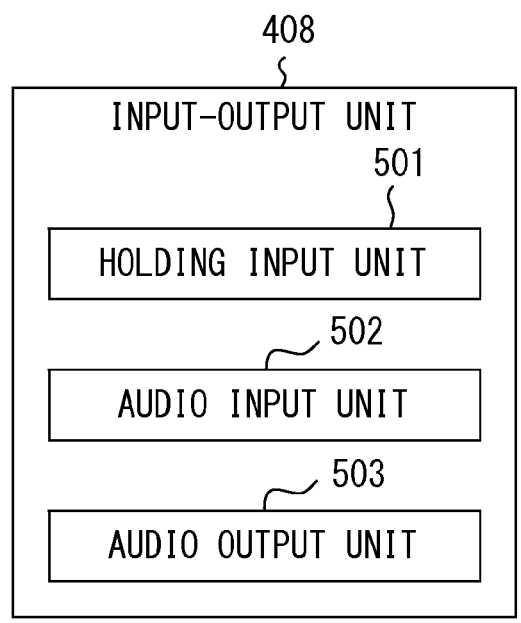
F I G. 5

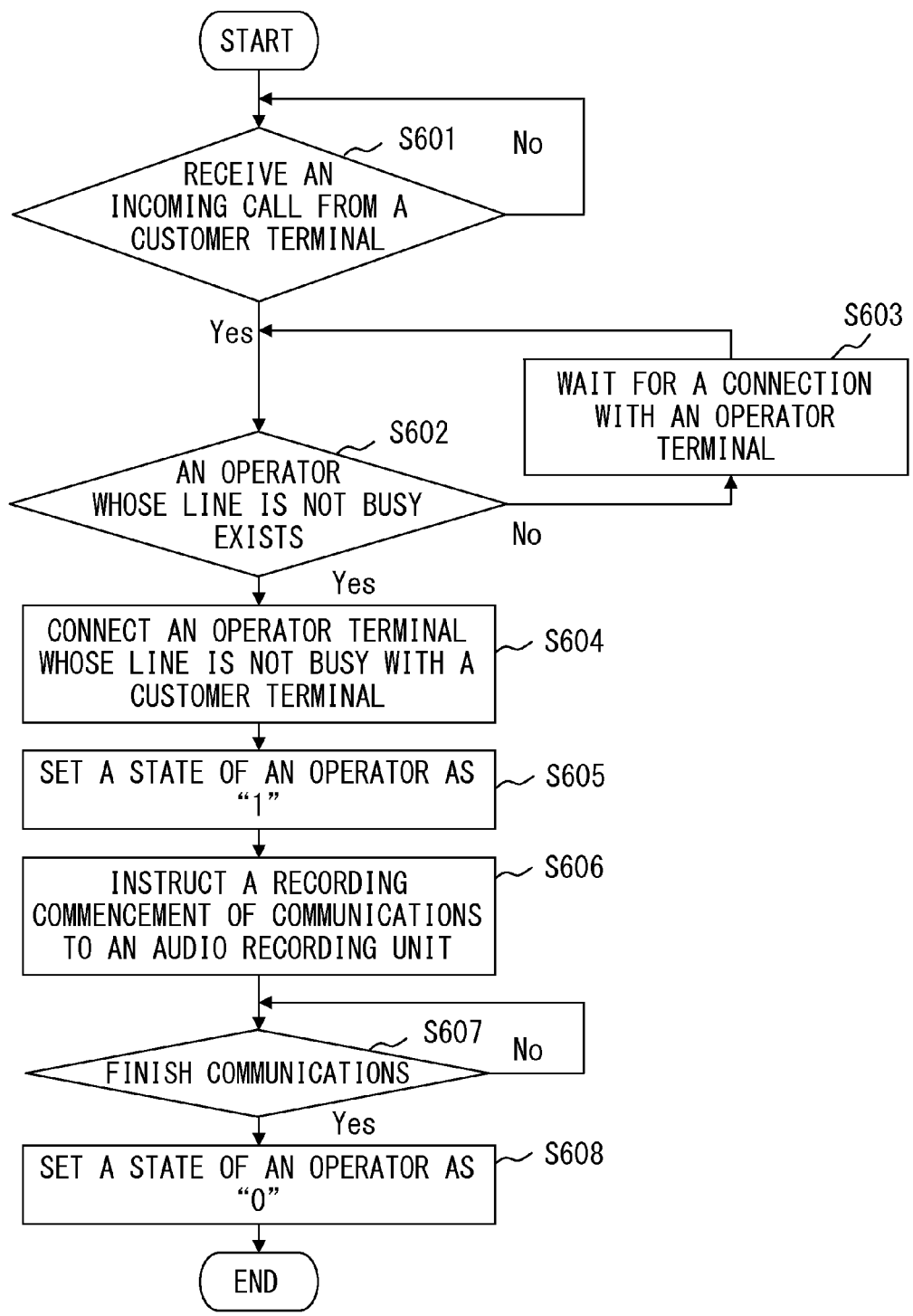
F I G. 6

305

| OPERATOR ID | COMMUNICATION STATE |
|---|---|
| OP11111 | 1 |
| OP22222 | 1 |
| OP33333 | 0 |
| ...... | ...... |

F I G. 7 A

306

| CALL ID | AUDIO FILE NAME | LEFT CHANNEL SPEAKER | RIGHT CHANNEL SPEAKER |
|---|---|---|---|
| 7840128 | 10080110232000.wav | OPERATOR | CUSTOMER |
| 7840129 | 10090116342010.wav | OPERATOR | CUSTOMER |
| 7840130 | 10090317321009.wav | OPERATOR | CUSTOMER |
| 7840131 | 10090312343000.wav | OPERATOR | CUSTOMER |
| ...... | ...... | ...... | ...... |

F I G. 7 B

307

| CALL ID | DATE AND HOUR | EVENT TYPE | AVERAGE VOLUME |
|---|---|---|---|
| 7840128 | 2010/1/1 10:23:43 | OPERATOR UTTERANCE START | - |
| 7840128 | 2010/1/1 10:23:59 | OPERATOR UTTERANCE FINISH | - |
| 7840128 | 2010/1/1 10:23:59 | CUSTOMER UTTERANCE START | - |
| 7840128 | 2010/1/1 10:24:01 | CUSTOMER UTTERANCE FINISH | 31 |
| 7840128 | 2010/1/1 10:24:01 | OPERATOR UTTERANCE START | - |
| 7840128 | 2010/1/1 10:24:03 | OPERATOR UTTERANCE FINISH | - |
| 7840128 | 2010/1/1 10:24:03 | CUSTOMER UTTERANCE START | - |
| 7840128 | 2010/1/1 10:24:45 | CUSTOMER UTTERANCE FINISH | 32 |
| 7840128 | 2010/1/1 10:24:47 | HOLDING COMMENCEMENT | - |
| 7840128 | 2010/1/1 10:24:50 | CUSTOMER UTTERANCE START | - |
| 7840128 | 2010/1/1 10:25:20 | CUSTOMER UTTERANCE FINISH | 12 |
| 7840128 | 2010/1/1 10:25:50 | CUSTOMER UTTERANCE START | - |
| 7840128 | 2010/1/1 10:25:55 | CUSTOMER UTTERANCE FINISH | 58 |
| 7840128 | 2010/1/1 10:35:10 | HOLDING RELEASE | - |
| 7840128 | 2010/1/1 10:35:13 | OPERATOR UTTERANCE START | - |
| 7840128 | 2010/1/1 10:35:26 | OPERATOR UTTERANCE FINISH | - |
| 7840128 | 2010/1/1 10:35:26 | CUSTOMER UTTERANCE START | - |
| 7840128 | 2010/1/1 10:35:27 | CUSTOMER UTTERANCE FINISH | 34 |
| ⋮ | ⋮ | ⋮ | ⋮ |

FIG. 11

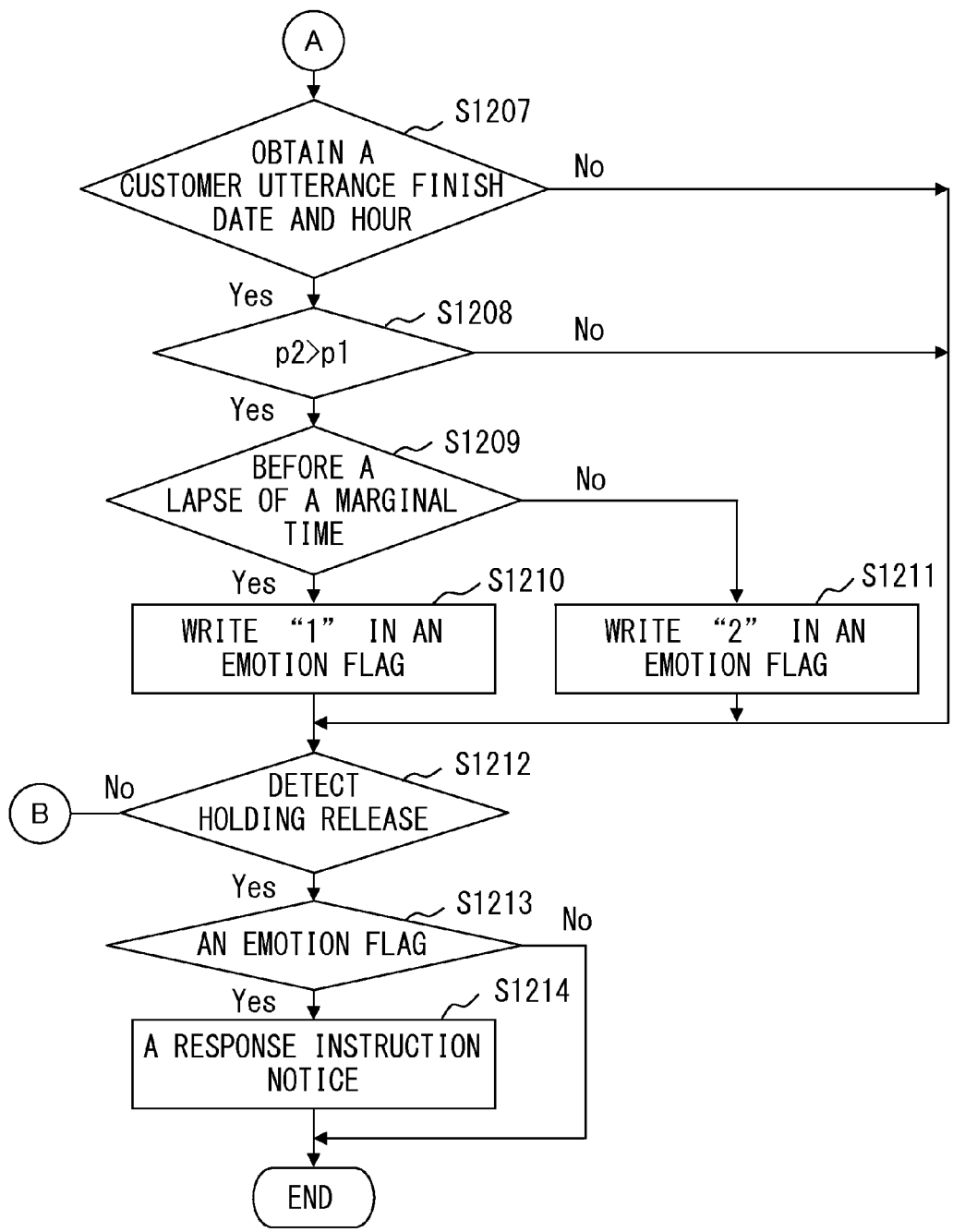
F I G. 1 2 B

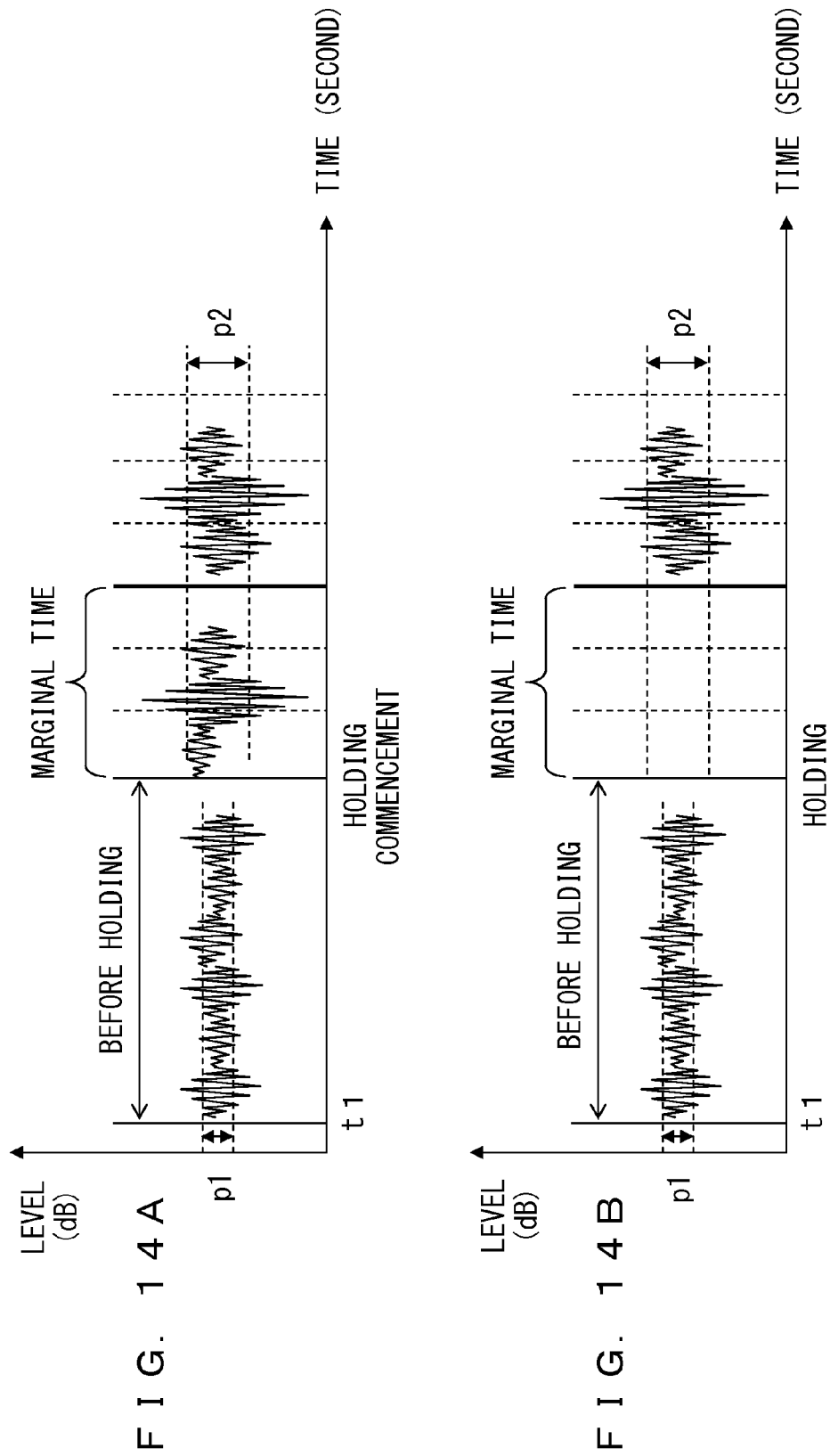

1501

IN REALITY, THE CUSTOMER SEEMS DISSATISFIED WITH YOUR RESPONSE. PLEASE CONSIDER A TRUE INTENT OF THE CUSTOMER AND RESTART CONVERSATIONS.

F I G. 1 5 A

1502

THE CUSTOMER SEEMS DISSATISFIED WITH A PROLONGED HOLDING. PLEASE RESTART CONVERSATIONS BY STATING "WE DO APOLOGIZE TO HAVE KEPT YOU WAITING SO LONG" FIRST.

F I G. 1 5 B

1503

IN REALITY, THE CUSTOMER SEEMS DISSATISFIED WITH YOUR RESPONSE. THE CUSTOMER ALSO SEEMS DISSATISFIED WITH A PROLONGED HOLDING. PLEASE CONSIDER A TRUE INTENT OF THE CUSTOMER AND PLEASE STATE "WE DO APOLOGIZE TO HAVE KEPT YOU WAITING SO LONG" FIRST AND RESTART CONVERSATIONS.

F I G. 1 5 C

308

| EMOTION FLAG | MESSAGE INFORMATION |
|---|---|
| 1 | mes_1 |
| 2 | mes_2 |
| 1, 2 | mes_3 |
| ⋮ | ⋮ |

F I G. 1 5 D

1801

| DETECTION DATE AND HOUR | DETECTION KEYWORDS |
|---|---|
| 2010/1/1　10:24:55 | "DISGUSTED" |
| 2010/1/1　10:24:59 | "IRRITATED" |
| ⋮ | ⋮ |

F I G. 1 8 A

1802

| "DISGUSTED" |
|---|
| "BE QUICK" |
| "IRRITATED" |
| "PULL YOURSELF TOGETHER" |
| ⋮ |

F I G. 1 8 B

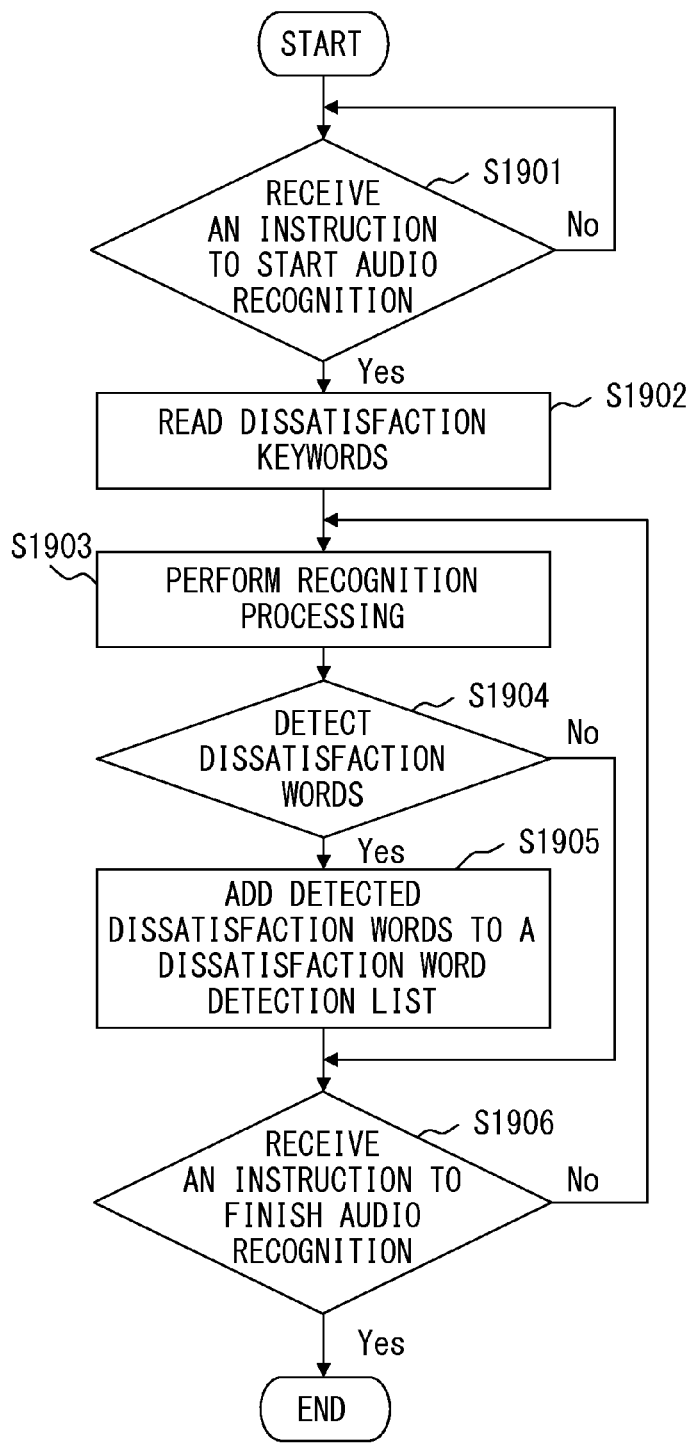
F I G. 19

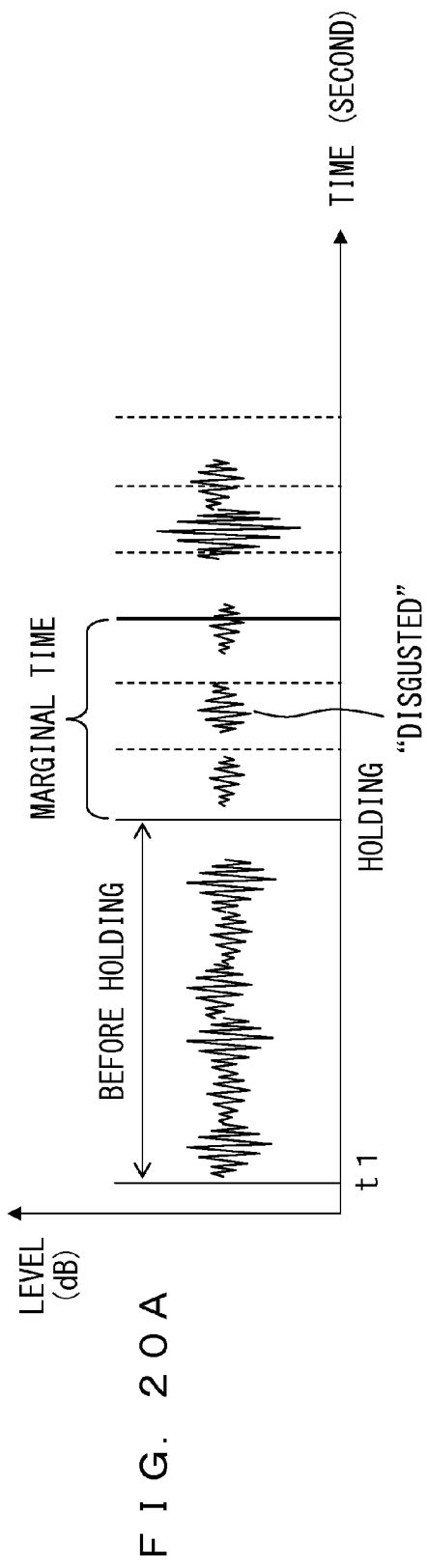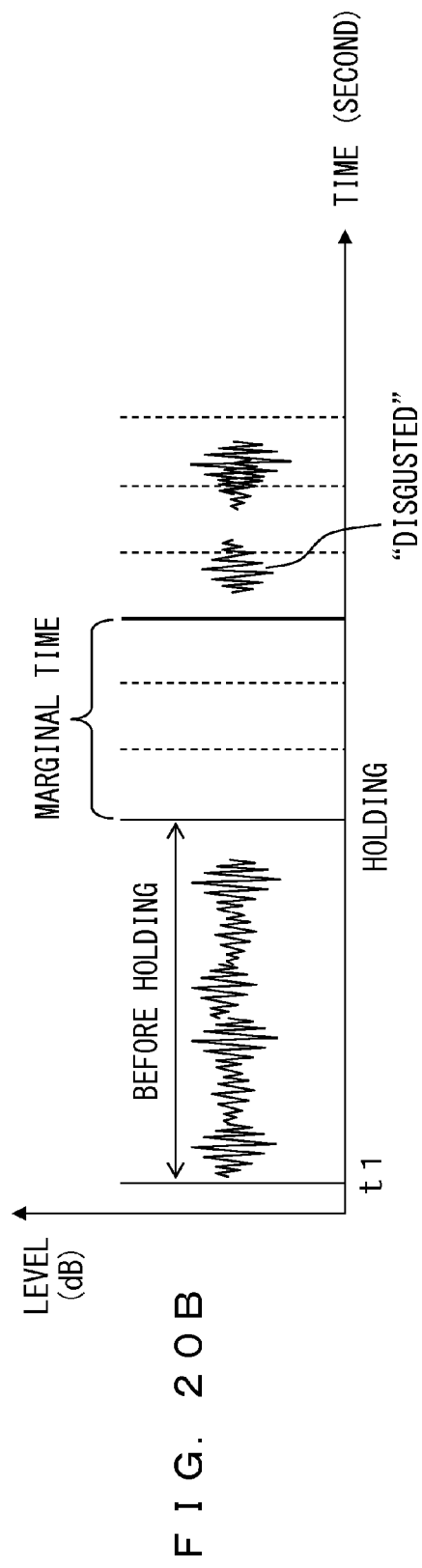

COMMUNICATION SUPPORT DEVICE AND COMMUNICATION SUPPORT METHOD

CROSS-REFERENCE TO RELATED APPLICATION

This application is a continuation application of International Application PCT/JP2011/055422 filed on Mar. 8, 2011 and designated the U.S., the entire contents of which are incorporated herein by reference.

FIELD

The present invention relates to a communication support device and a communication support method, for supporting communication.

BACKGROUND

Conventionally, when an operator conducts telephone communications with a customer in a call center, in order to support an appropriate response to the customer, a technology is known of measuring a psychological state of the customer from the customer's utterances during the communications and reporting the psychological state of the customer to the operator. As examples of technologies of grasping the psychological state of a customer, a technology of determining a dissatisfaction level of the customer by the number of dissatisfaction keywords expressed during communications, or a technology of obtaining utterance information of the customer by utterance recognition processing and determining the customer's emotions by using rhythmic features such as verbal information, speech speed, utterance volume, and the like, is known. Further, a technology of determining a user's emotions by relating words to emotions is also known. However, since the customer often does not express his real emotions, trying to control his emotions during the conversations with the operator, it is difficult to accurately grasp the psychological state of the customer by utterances during the communications by conventional technologies. Therefore, in order to accurately measure the psychological state of the customer, a technology of obtaining the utterances of the customer without the conscious knowledge of the operator and measuring the psychological state of the customer by utilizing the obtained utterances is desired.

As related technologies, a technology of a hold release of a private branch exchange in which a held party side (customer side) may release the hold by an utterance so as to leave a message, or a technology of restoring the held party side (operator side) to a non-holding state via a request from the held party side during a holding state and calling a holding party side is known. In addition, a technology in which the held party cuts off the communications and leaves a message for the holding party, or a technology of channeling the utterances of the held party side to a monitor speaker after a lapse of a prescribed time of the holding state is known. A purpose of any of the above mentioned technology related to the holding release is that the held party side intentionally tells his request or desire to the holding party side.

Japanese Laid-open Patent Publication No. 2005-142897
Japanese Laid-open Patent Publication No. 2008-53826
Japanese Patent No. 3857922
Japanese Laid-open Patent Publication No. 2000-83098
Japanese Laid-open Patent Publication No. 06-37895
Japanese Laid-open Patent Publication No. 09-200340
Japanese Laid-open Patent Publication No. 05-219159

SUMMARY

In a communication performed between a first terminal used by a first speaker and a second terminal used by a second speaker which is an aspect of the embodiments of the present application, a communication support device for supporting a second speaker includes an analyzing unit and an instructing unit.

The analyzing unit is configured to detect a holding state of the communication commenced by a holding notice transmitted by the second terminal, and to analyze features of utterance information of the first speaker in the holding state.

The instructing unit is configured to output to the second terminal determination information on the first speaker based on the features of the utterance information of the first speaker.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates one example of a system which supports communications.

FIG. 2 illustrates one example of hardware of a communication support device.

FIG. 5 illustrates one example of a device connected to an operator terminal.

FIG. 6 is a flow diagram which illustrates one example of an operation of a connecting unit.

FIGS. 7A and 7B illustrate one example of a data structure of operator information and utterance information.

FIG. 11 illustrates one example of a data structure of speech date and hour information.

FIGS. 12A and 12B illustrate one example of an operation of an analyzing unit in an embodiment 1.

FIGS. 14A and 14B illustrate a time chart of one example of a method of analyzing utterance features of a customer in an embodiment 1.

FIGS. 15A, 15B, 15C and 15D illustrate one example of a data structure of a message content and response information.

FIGS. 18A and 18B illustrate one example of a data structure of dissatisfaction word detection information and dissatisfaction keyword information.

FIG. 19 illustrates one example of an operation of utterance recognition processing.

FIGS. 20A and 20B illustrate a time chart of one example of a method of analyzing utterance features of a customer in an embodiment 2.

DESCRIPTION OF EMBODIMENTS

Figure 3:
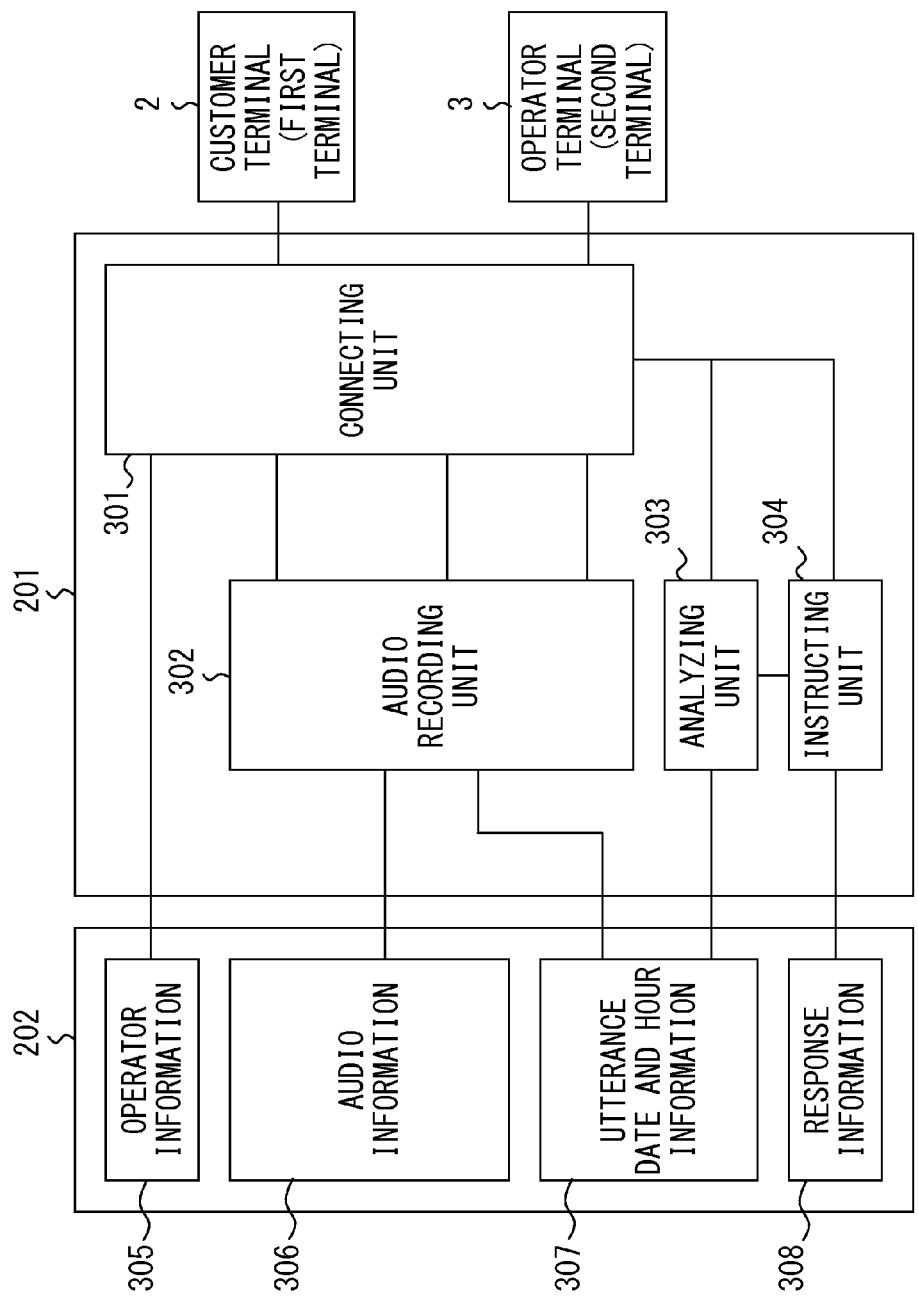
FIG. 3 illustrates one example of a function of a controlling unit and a storing unit.

Hereinafter, a detailed explanation is given for the present embodiments, based on drawings.

According to embodiment 1, by obtaining the utterances expressed by the customer in the holding state as instructed by the operator during communications, analyzing the features of the obtained utterances, and measuring the psychological state of the customer based on the analyzed result, accuracy in measuring the psychological state of the customer may be enhanced. That is to say, it is assumed that the customer, while on hold, since he is not aware that his own conversation is being transmitted to the operator, is frankly expressing his real emotions, such as dissatisfaction or the like, by murmuring aloud, clucking, sighing, or the like. Accordingly, by obtaining utterances expressed by the customer in a holding state which were not utilized for measuring the psychological state of the customer in the past, and by performing the later mentioned analytical processing to the obtained utterance features, accuracy in measuring the psychological state of the customer may be enhanced. Further, by enhancing the accuracy in measuring the psychological state of the customer, as support to the operator the instruction to the customer may become appropriately correspondent to the psychological state of the customer.

FIG. 1 illustrates one example of a system which supports communications. A system depicted as FIG. 1 has a communication support device 1 (server), a customer terminal 2 (first terminal), and an operator terminal 3 (second terminal), and the communication support device 1 and the customer terminal 2 are connected via a network 4 such as public lines, e.g., Internet or dedicated lines. The communication support device 1 and the operator terminal 3 are connected via a network, for example in a call center. Further, the communication support device 1 provided separately from the call center and the operator terminal 3 into the call center may be connected to the network 4. The customer terminal 2 includes, for example, telephone equipment, Internet Protocol (IP) telephone equipment, a softphone used by the customer, and the like. The operator terminal 3 will be discussed later.

Explanation is given for the communication support device 1.

FIG. 2 illustrates one example of hardware of a communication support device. The communication support device 1 includes a controlling unit 201, a storing unit 202, a recording medium reading device 203, an input-output interface 204 (input-output I/F), a communication interface 205 (communication I/F), and the like. Further, the above mentioned components are respectively connected by a bus 206.

It is considered that the communication support device 1 is realized by using a server and the like. The communication support device 1 has a controlling unit 201 (processor), a storing unit 202, and the like. The controlling unit 201 has a later mentioned connecting unit 301, an utterance recording unit 302, an analyzing unit 303, an instructing unit 304, and the like. Further, it is considered that the controlling unit 201 uses a multicore Central Processing Unit (CPU), a Field Programmable Gate Array (FPGA), a Programmable Logic Device (PLD), and the like. That is to say, since it is requested to provide rapid instructions to the operator, it is requested that the controlling unit 201 is so configured that each processing unit operate in parallel and that calculation results in each processing unit be used in conjunction.

The storing unit 202 stores the later mentioned operator information 305, utterance information 306, speech date and hour information 307, response information 308, and the like. As the storing unit 202, for example, memory such as Read Only Memory (ROM), Random Access Memory (RAM), and the like, and hard disks, and the like, are considered. In the storing unit 202, data such as parameter values, variable values, and the like, may be recorded, or data such as parameter values, variable values, and the like, may be used as a work area at the time of execution. The above mentioned operator information 305, utterance information 306, speech date and hour information 307, response information 308, and the like may be stored by a storing method other than a table, and may be recorded in a database as hardware.

The recording medium reading device 203 controls a read/write of data for a recording medium 207, following the control by the controlling unit 201. Then, the recording medium reading device 203 causes the recording medium 207 to record the data written with the control of the recording medium reading device 203, or causes the recording medium 207 to read the recorded data. The detachable recording medium 207 includes a magnetic recording apparatus, an optical disk, a magnetooptical medium, semiconductor memory, and the like, as computer readable non-transitory recording medium. The magnetic recording apparatus includes a hard disk device (HDD), and the like. The optical disk includes a Digital Versatile Disk (DVD), DVD-RAM, Compact Disk Read Only Memory (CD-ROM), CD-R (Recordable)/RW (ReWritable), and the like. The magnetooptical medium includes Magneto-Optical Disc (MO), and the like. The storing unit 202 is also included in the non-transitory recording medium.

An input-output unit 208 is connected to the input-output interface 204, and the input-output unit 208 receives the information input by the user and transmits to the controlling unit 201 via a bus 206. In addition, following the instructions from the controlling unit 201, operating information and the like are displayed on a display screen. As an input device of the input-output unit 208, for example, a keyboard, a pointing device (mouse and the like), a touch panel, and the like, are considered. As a display which is an output device of the input-output unit 208, for example, a liquid crystal display and the like are considered. Further, the output unit may be the output device such as a Cathode Ray Tube (CRT) display, a printer, and the like.

The communication interface 205 is an interface for performing a Local Area Network (LAN) connection, an Internet connection, and a wireless connection between a customer terminal 2 and an operator terminal 3. The communication interface 205 is also an interface for performing a LAN connection, an Internet connection, and a wireless connection with other computers, as needed. Further, the communication interface 205 is connected to other devices and controls data input and output from an external device.

By using a computer having such a hardware structure, a later mentioned variety of processing functions are realized. In such cases, a program which describes the processing content of the functions that the system preferably has is provided. By executing the program with the computer, the above mentioned processing functions are realized on the computer. The program with the processing content described may be recorded in the computer-readable recording medium 207.

When distributing the program, for example, the recording medium 207 such as the DVD, the CD-ROM, and the like with the program recorded is sold. The program may be recorded in the storage device of a server computer and the program may be transferred to the other computer from the server computer via a network.

The computer which executes the program, records in its storing unit 202 the program recorded in the recording medium 207 or the program transferred from the server computer, for example. Then, the computer reads the program from its storing unit 202, and executes the processing, following the program. The computer may also read the program directly from the recording medium 207 and execute the processing, following the program. Further, the computer may also sequentially execute the processing, following the received program, every time the program is transferred from the server computer.

Explanation is given for a controlling unit 201 and a storing unit 202.

FIG. 3 illustrates one example of a function of a controlling unit and a storing unit. The controlling unit 201 in FIG. 3 has a connecting unit 301, an utterance recording unit 302, an analyzing unit 303, an instructing unit 304, and the like.

The connecting unit 301, when it receives an incoming call from the customer terminal 2, for example, retrieves later mentioned operator information 305 and extracts an operator whose line is not busy. For example, by referring to an identifier which indicates whether or not the line of the operator is busy, the connecting unit 301 extracts an operator whose line is not busy. When the operator whose line is not busy is extracted, the connecting unit 301 connects the extracted operator terminal 3 to the customer terminal 2 which received the incoming call, to enable communications. Then, the connecting unit 301 instructs the utterance recording unit 302 to issue a recording commencement notice of the communications. When the connecting unit 301 detects the finish of the communications between the extracted operator terminal 3 and the customer terminal 2, the connecting unit 301 finishes the communications, and records in the operator information 305 the identifier which indicates that the operator line is not busy.

In addition, by receiving a holding notice transmitted from the controlling unit 401 of the operator terminal 3, the holding notice being set to a holding state, the connecting unit 301 transmits a holding message to the customer terminal 2 instead of utterance information transmitted from the operator terminal 3. In addition, the connecting unit 301 transmits the holding notice set to, for example, a holding state to the utterance recording unit 302 and the analyzing unit 303.

Further, by receiving the holding notice transmitted from the controlling unit 401 of the operator terminal 3, the holding notice indicating the holding release, the connecting unit 301 transmits, to the customer terminal 2, the utterance information from the operator terminal 3 instead of the holding messages which have been transmitted so far. In addition, the connecting unit 301 transmits the holding notice indicating, for example, the holding release, to the utterance recording unit 302 and the analyzing unit 303.

The utterance recording unit 302, when it receives an instruction of the recording commencement notice from the connection unit 301, matches the customer utterances and the operator utterances to the date and hour or a lapsed time from the commencement of the communications, and records the customer utterances and the operator utterances in later-described utterance information 306. Only the customer utterances may be recorded in the utterance information 306.

The analyzing unit 303 detects the holding state of the communications commenced by the holding notice transmitted by the operator terminal 3, and analyzes the features of the utterance information of the customer in the holding state. The analyzing unit 303 stores the customer utterances transmitted from the customer terminal 2 in the storing unit 202. The analyzing unit 303 obtains, via the connecting unit 301, the holding notice transmitted from the operator terminal 3 used by the operator who communicates with the customer, the holding notice setting the communications with the customer terminal 2 to a holding state, and analyzes the utterance features of the customer which corresponds to the time of the holding state. Then, in accordance with the analytical result, the analyzing unit 303 reports to the operator terminal 3 the response to be taken by the operator for the customer. In addition, the analyzing unit 303 analyzes the utterance features of the customer and determines whether or not the average value p2 of the utterance level of the customer during the time corresponding to the holding state is greater than the average value p1 of the utterance level corresponding to the time before the holding state. Then, when the average value p2 is greater than the average value p1, the analyzing unit 303 reports, to the instructing unit 304, that the customer is dissatisfied with the response taken by the operator.

Further, the analyzing unit 303 analyzes the utterance features of the customer and when it is determined that the average value p2 is greater than the average value p1 after a lapse of a prescribed time from the date and hour of a shift to a holding state, the analyzing unit 303 reports to the instructing unit 304 that the customer is dissatisfied with prolonged holding.

The instructing unit 304 obtains, from response information 308, message information (determination information) which corresponds to the psychological state of the customer obtained by the analyzing unit 303, and outputs to the operator terminal 3. For example, the instructing unit 304 outputs to the operator terminal 3 the determination information on the relevant customer who is speaking based on the features of the utterance information of the customer. The determination information is the information on the action to be taken by the operator for the customer.

The storing unit 202 of FIG. 3 stores operator information 305, utterance information 306, speech date and hour information 307, response information 308, and the like. The operator information 305, utterance information 306, speech date and hour information 307, and response information 308 will be mentioned later.

Explanation is given for the operator terminal 3.

Figure 4:
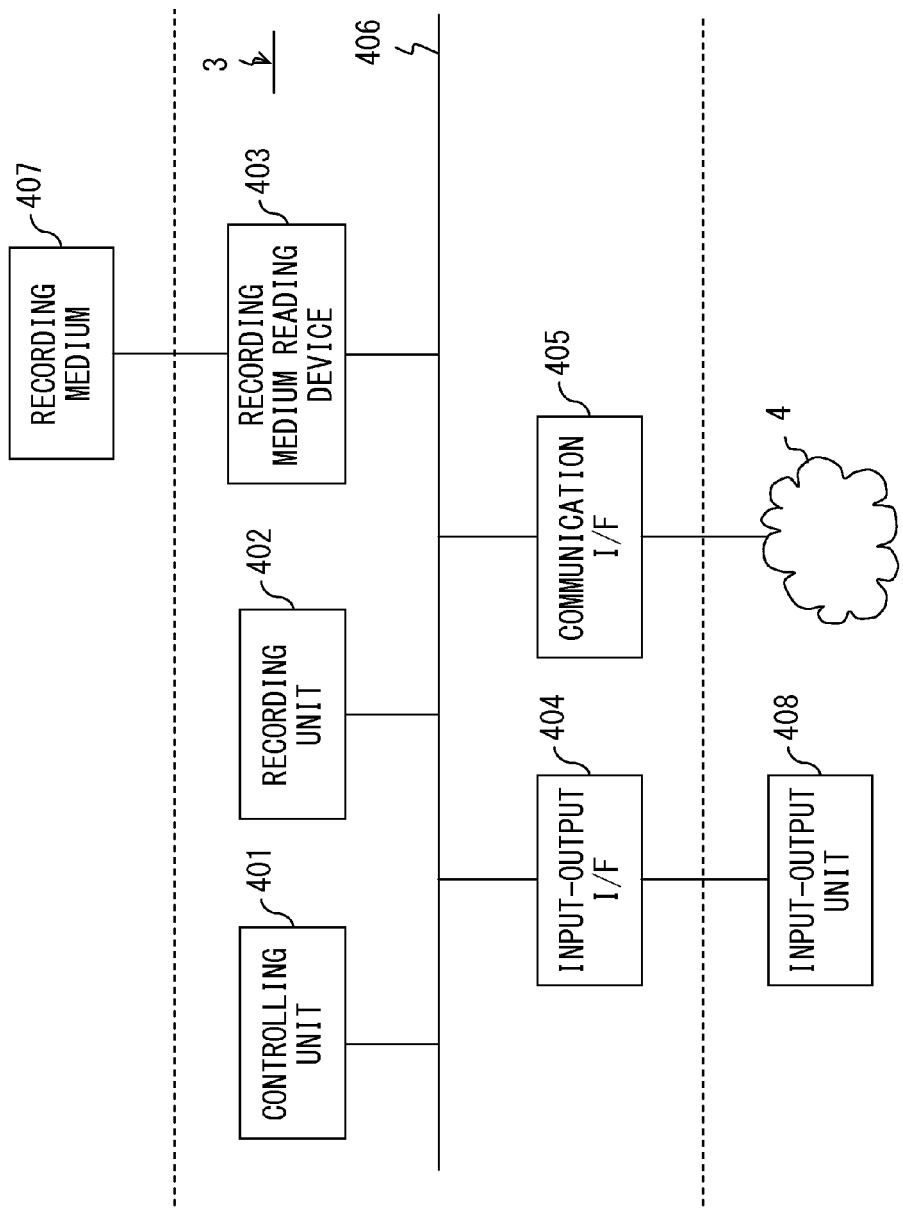
FIG. 4 illustrates one example of hardware of an operator terminal.

FIG. 4 illustrates one example of hardware of an operator terminal. It is considered that the operator terminal 3 uses a Personal Computer (PC), and the like. The operator terminal 3 includes a controlling unit 401 (processor), a storing unit 402, a recording medium reading device 403, an input-output interface 404 (input-output I/F), a communication interface 405 (communication I/F), and the like. Further, the above mentioned components are connected by a bus 406, respectively. It is considered that the controlling unit 401 uses a multicore Central Processing Unit (CPU), a Field Programmable Gate Array (FPGA), a Programmable Logic Device (PLD), and the like. The controlling unit 401 controls each unit of the operator terminal 3.

As the storing unit 402, for example, memory such as Read Only Memory (ROM), Random Access Memory (RAM), and the like, and hard disks and the like, are considered. Data such as parameter values, variable values, and the like may be stored in the storing unit 402, or data such as parameter values, variable values, and the like may be used as a work area at the time of execution.

The recording medium reading device 403 controls read/write of data for a recording medium 407, following the control of the controlling unit 401. Then, the recording medium reading device 403 causes the recording medium 407 to record the data written with the control of the recording medium reading device 403, or causes the recording medium 407 to read the recorded data. The detachable recording medium 407 includes a magnetic recording apparatus, an optical disk, a magnetooptical medium, and semiconductor memory, and the like, as a computer readable non-transitory recording medium. The magnetic recording apparatus includes a hard disk device (HDD), and the like. The optical disk includes a Digital Versatile Disk (DVD), DVD-RAM, Compact Disk Read Only Memory (CD-ROM), CD-R (Recordable)/RW (ReWritable), and the like. The magnetooptical medium includes Magneto-Optical Disc (MO), and the like. The storing unit 402 is also included in the non-transitory recording medium.

An input-output unit 408 is connected to the input-output interface 404, and the input-output unit 408 receives the information input by the user and transmits it to the controlling unit 401 via a bus 406. Further, following the instruction from the controlling unit 401, operating information and the like is displayed on a display screen. As the input device of the input-output unit 408, for example, a keyboard, a pointing device (mouse and the like), a touch panel, and the like, are considered. As a display which is the output device of the input-output unit 408, for example, a liquid crystal display and the like is considered. Further, the output unit may be the output device such as a Cathode Ray Tube (CRT) display, a printer, and the like.

FIG. 5 illustrates one example of a device connected to an operator terminal. The input-output unit 408 connected to the operator terminal 3 depicted as FIG. 5 has a holding input unit 501, an utterance input unit 502, and an utterance output unit 503 depicted as FIG. 5. The holding input unit 501 reports to the communication support device 1 a commencement and release of the holding state. In the holding notice of the commencement and release of a holding state, a notice is issued informing the communication support device 1 of the commencement of the holding, when playing music and the like during the time of keeping the customer waiting, since the operator may for example require some time to prepare for the response in replying to the customer inquiry. When restarting the communications, the notice informing the communication support device 1 of release of the holding state is issued. The utterance input unit 502 obtains the utterances expressed by the operator and inputs the utterances of the operator into the operator terminal 3. The utterance input unit 502 includes, for example, a microphone and the like. The utterance output unit 503 outputs the utterances of the customer sent from the customer terminal 2. The utterance output unit 503 includes, for example, headphones, a speaker, and the like. The utterance input unit 502 and the utterance output unit 503 may be a head set.

The communication interface 405 is the interface for performing a Local Area Network (LAN) connection, Internet connection, and a wireless connection between the communication support device 1 and the customer terminal 2. The communication interface 405 is also the interface for performing the LAN connection, the Internet connection, and the wireless connection with other computers, as needed. Further, the communication interface 405 is connected to other devices and controls data input and output from an external device.

Explanation is given for an operation of a communication support device.

FIG. 6 is a flow diagram which illustrates one example of an operation of a connecting unit. In step S 601, the connecting unit 301 receives the incoming call transmitted from the customer terminal 2. When the connecting unit 301 receives the incoming call (Yes), it moves on to step S 602, and when it does not (No), it waits for the receipt.

When the receipt of the incoming call is detected, in step S 602, the connecting unit 301 detects whether or not the operator whose line is not busy exists, by retrieving the operator information 305. The operator information is the information which indicates whether or not the line of the operator is busy, with the operator terminal 3 used by the operator being connected to the customer terminal 2.

FIGS. 7A and 7B illustrate one example of a data structure of operator information and utterance information. The operator information 305 depicted as FIG. 7A has an "operator ID" and a "communication condition". In the "operator ID", identifiers for identifying the operator terminal 3 currently used by the operator are recorded. In the present example, "OP11111", "OP22222", "OP33333", and the like, are recorded as the identifiers of the operator terminal. In the "communication condition", the identifiers indicating whether or not the line of the operator is busy are recorded, with the operator terminal 3 being currently connected to the customer terminal 2. In the present example, as the identifiers, "1" indicating that the line is busy and "0" indicating that the line is not busy but is in an idle state are recorded, are associated with the identifiers of the operator terminal.

Next, in step S 602, when the connecting unit 301 detects the operator terminal 3 in an idle state (Yes), it moves on to step S 604. On the other hand, when the connecting unit 301 cannot detect the operator terminal 3 in an idle state (No), it moves on to step S 603.

In step S 603, the connection to the customer terminal 2 which received the incoming call waits until the connecting unit 301 detects the operator terminal 3 in an idle state in the operator information. Here, the waiting time and the customer utterances from the receipt of the incoming call to the connection may be recorded in the utterance information 306. That is to say, data such as music, vocal guidance, and the like is transmitted to the customer terminal 2 during the waiting time as well, and it is considered to be the same as the holding state instructed by the operator during the communications. Accordingly, it is assumed that the customer, since he is not aware that his own conversation is being transmitted to the operator, is frankly expressing his real emotions such as dissatisfaction or the like, by murmuring aloud, clucking, sighing, or the like. The customer utterances obtained in this state may be used as data for measuring the psychological state of the customer, after the operator terminal 3 is determined.

In step S 604, the connecting unit 301 connects the customer terminal 2 to an operator terminal 3 whose line is not busy. Since the operator corresponding to the identifier "OP33333" of the operator terminal is in an idle state, the connecting unit 301 connects the operator terminal to the customer terminal 2 which received the incoming call.

In step S 605, the connecting unit 301 changes the state of the operator in the operator information to the identifier indicating a busy state. In the operator information 305 of FIG. 7A, when the operator terminal 3 and the customer terminal 2 are connected, the identifier is changed from the identifier "0" indicating the idle state to the identifier "1" indicating the busy state.

In step S 606, the connecting unit 301 reports to the utterance recording unit 302, and includes, in the recording notice, the information which indicates the recording commencement of the communications. The utterance recording unit 302 records the operator utterances and the customer utterances which receive the recording notice indicating the recording commencement.

In step S 607, the connecting unit 301 detects whether or not the communications between the customer terminal 2 and the operator terminal 3 have finished, and when the connecting unit 301 detects that the communications have finished (Yes), it moves on to step S 608, and when the communications are continuing (No), it moves on to step S 607.

When the connecting unit 301 detects that the communications between the customer terminal 2 and the operator terminal 3 have finished, in step S 608, the connecting unit 301 changes the communication state of the operator terminal 3 in the operator information to the identifier which indicates that it is currently in an idle state. In the operator information 305 of FIG. 7A, the identifier is changed from the identifier "1" indicating that the operator terminal 3 is busy to the identifier "0" indicating that the operator terminal 3 is idle. Further, in step S 608, the connecting unit 301 transmits, to the utterance recording unit 302, the recording notice which includes the information indicating that the communications have finished.

Explanation is given for an operation of an utterance recording unit.

Figure 8:
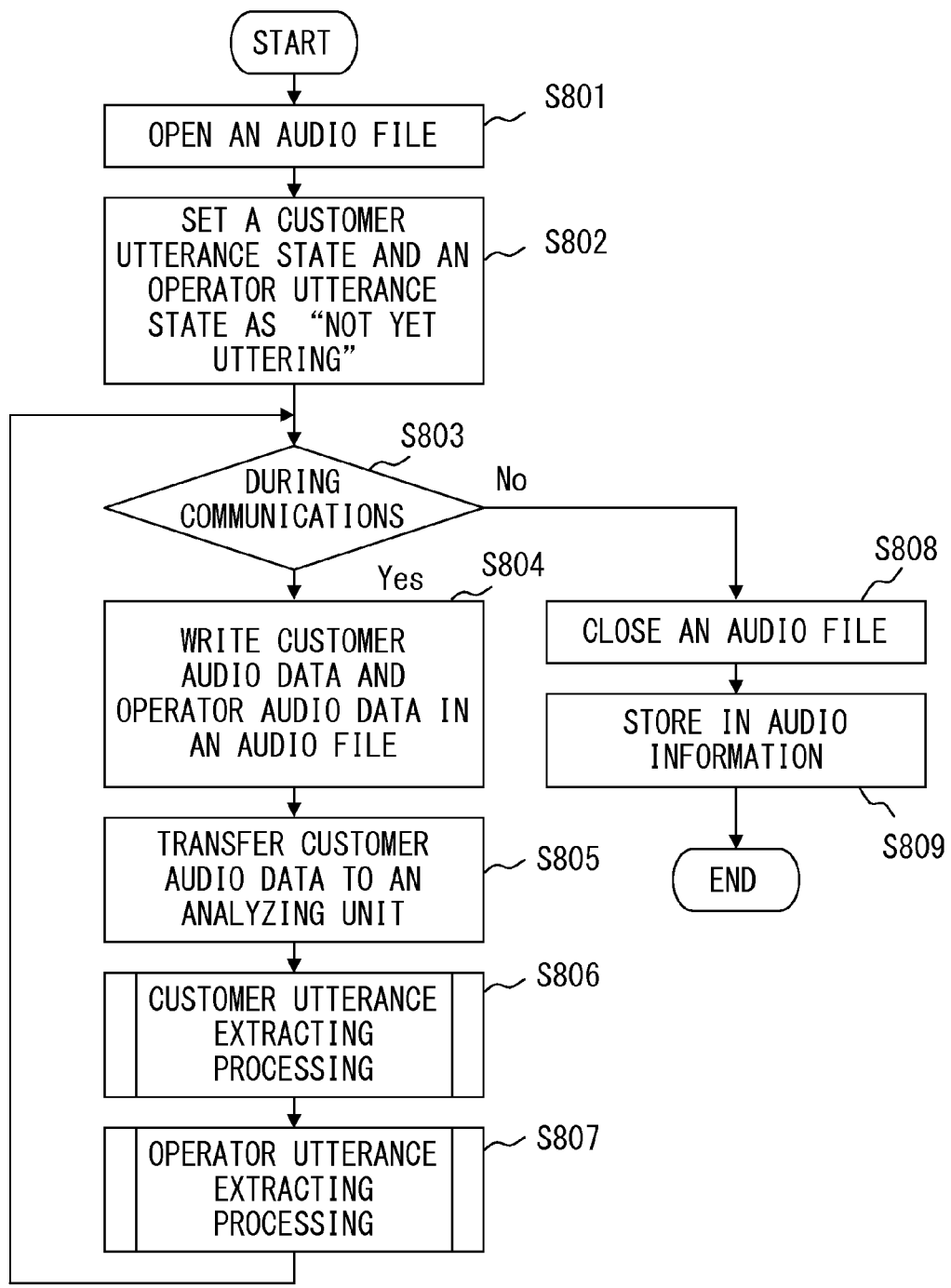
FIG. 8 is a flow diagram which illustrates one example of an operation of an utterance recording unit.

FIG. 8 is a flow diagram which illustrates one example of an operation of an utterance recording unit. In step S 801, when the utterance recording unit 302 receives the recording commencement notice transmitted from the connecting unit 301, the utterance recording unit 302 opens an utterance file which records the customer utterances and the operator utterances. In the utterance file, utterance data recorded, for example, in a wave format or an MP3 format, are recorded.

In step S 802, the utterance recording unit 302 records in the storing unit 202 that the customer and the operator have not yet started speaking although the line is in a busy state. The utterance recording unit 302 secures a customer speech storage area and an operator speech storage area in the storing unit 202, as temporary, for example, and when there is no speech, the utterance recording unit 302 stores "not yet speaking", which indicates that the speaking has not yet been performed, while the utterance recording unit 302 stores "speaking", which indicates that the speech is being made between the customer and the operator. Here, since little time has passed after the connection, the utterance recording unit 302 stores "not yet speaking" in the customer speech storage area and the operator speech storage area, respectively, assuming that there has not been any speech yet between the customer and the operator. Determination of whether or not speaking has been performed will be discussed later.

In step S 803, the utterance recording unit 302 determines whether or not the line is busy, and when the line is busy (Yes), it moves on to step S 804, and when the communications finish (No), it moves on to step S 808. When, for example, the utterance recording unit 302 obtains, from the connecting unit 301, the recording notice which includes the information indicating that the communications have finished, it moves on to step S 808.

In step S 804, the utterance recording unit 302 obtains the utterance data of the customer and the utterance data of the operator, via the connecting unit 301 at a determined cycle, and writes this in the utterance file. For example, it writes the utterance data of the customer and the utterance data of the operator in the utterance file every 20 milliseconds. However, the writing of the utterance data is not limited to every 20 millisecond.

In step S 805, the utterance recording unit 302 transfers the utterance data of the customer to the analyzing unit 303 at a determined cycle. For example, it transfers the utterance data of the customer to the analyzing unit 303 every 20 millisecond. However, the writing of the utterance data of the customer is not limited to every 20 millisecond.

In step S 806, the utterance recording unit 302 performs the customer speech extracting processing for extracting the speech of the customer, and in step S 807, the utterance recording unit 302 performs the operator speech extracting processing for extracting the speech of the operator. The customer speech extracting processing and the operator speech extracting processing will be mentioned later.

In step S 808, the utterance recording unit 302 closes the utterance file, and in step S 809, the utterance recording unit 302 stores the utterance file in the utterance information. For example, when the utterance recording unit 302 obtains from the connecting unit 301 the recording notice which includes information indicating that the communications have finished, the utterance recording unit 302 closes the utterance file depicted as FIG. 7B and records the recording notice in the utterance information 306. The utterance information 306 depicted as FIG. 7B has a "call ID", a "utterance file name", a "left channel speaker", and a "right channel speaker". The "call ID" is an identifier attached to communications performed between the customer terminal 2 and the operator terminal 3. In the present example, as the identifiers to identify the communications, "7840128", "7840129", "7840130", and "7840131", and the like, are recorded. In the "utterance file name", names which indicate the utterance file prepared by the utterance recording unit 302 are stored, associated with the "call ID". Further, a recording place of the utterance file is recorded, associated with the utterance data. In the present example, as names of the utterance files, "10080110232000.wav", "10090116342010.wav", "10090317321009.wav", "10090312343000.wav", and the like, are recorded. In the "left channel speaker" and "right channel speaker", information indicating the channel in which the customer or operator is recorded is recorded. In the present example, an "operator" which indicates that it is a speech by the operator is recorded in the left channel, and a "customer" which indicates that it is a speech by the customer is recorded in the right channel.

Explanation is given for an operator speech extracting processing and customer speech extracting processing.

Figure 9:
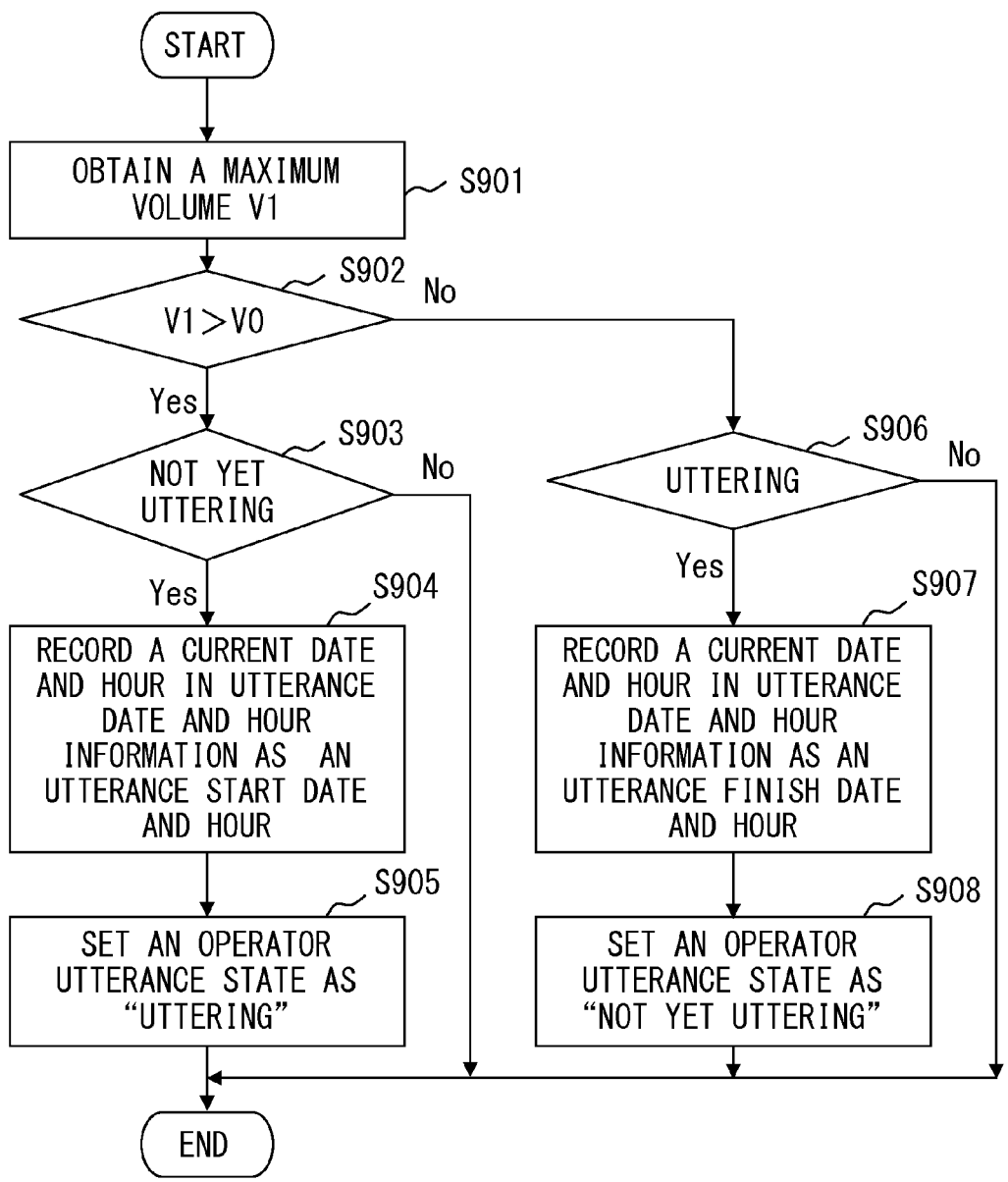
FIG. 9 illustrates one example of an operation of an operator speech extracting processing.
Figure 10:
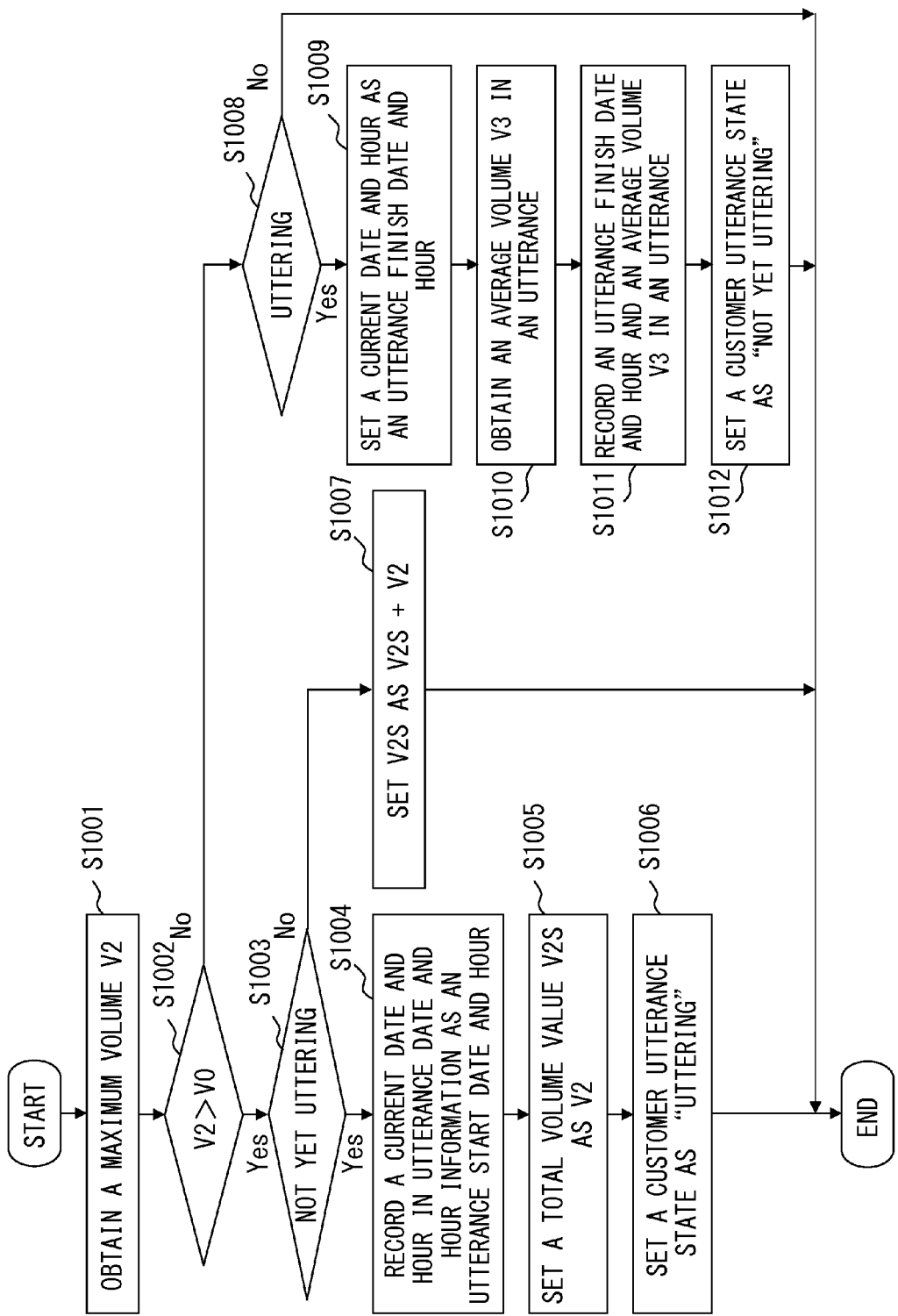
FIG. 10 illustrates one example of an operation of an operator speech extracting processing.

FIG. 9 illustrates one example of an operation of an operator speech extracting processing. FIG. 10 illustrates one example of an operation of an operator speech extracting processing.

In step S 901 of FIG. 9, the utterance recording unit 302 obtains a maximum volume value V1, using the utterance data of the operator for cycles obtained for each prescribed cycle. For example, the utterance recording unit 302 obtains the utterance data of the operator for 20 milliseconds for each 20 millisecond cycle, analyzes the data indicating the volume included in the utterance data for 20 milliseconds, and obtains the maximum volume value V1. The cycle is not limited to 20 milliseconds, however.

In step S 902, the utterance recording unit 302 compares the maximum volume value V1 and the prescribed volume value V0 for each prescribed cycle and determines whether or not V1 is greater than V0. When V1 is greater than V0 (Yes), it moves on to step S 903, and when V1 is not greater than V0 (No), it moves on to step S 906. Here, a silence value V0 is a volume which is considered silence. The silence value V0 may be obtained, for example, by measuring noise in idle states, and defining the average of the measured values as the silence value V0.

In step S 903, the utterance recording unit 302 refers to an operator speech storage area and determines whether or not the speech has not yet been started. When the speech has not been started (Yes), it moves on to step S 904, and otherwise (No), it finishes the operator speech extracting processing and moves on to the subsequent customer speech extracting processing.

In step S 904, the utterance recording unit 302 records, in speech date and hour information, the current date and hour and information which indicates that the operator has started speaking. For example, it records it as depicted as the speech date and hour information 307 in FIG. 11.

FIG. 11 illustrates one example of a data structure of speech date and hour information. The speech date and hour information 307 in FIG. 11 has a "call ID", a "date and hour", an "event type", and an "average volume in an instance of speech". The "call ID" is an identifier attached to communications performed between the customer terminal 2 and the operator terminal 3. In the present example, as the identifier to identify the communications, "7840128", and the like, are recorded. In the "date and hour", the current date and hour at which the operator has started speaking is stored. In the present example, "2010/1/1 10:23:43", "2010/1/1 10:23:59", "2010/1/1 10:24:01", and the like, indicating the year, month, date and time, are recorded. In the "event type", information which indicates such event types as a start or finish of an instance of speech of an operator or customer is recorded, associated with the "date and hour". In the present example, an "operator speech start", "operator speech finish", "customer speech start", "customer speech finish", "holding commencement", and "holding release" are recorded as information to classify the events. The information which indicates that the operator has started an instance of speech is "operator speech start". In the "average volume in a speech", the average volume for the time when the customer spoke is recorded. How to obtain the average volume in an instance of speech will be discussed later. In the present example, V3, "31", "32", "12", "58", and "34" are recorded as the average volumes in an instance of speech, associated with the time when the customer spoke. The average volume in an instance of speech may be indicated by a gain (dB), and is not limited as long as it indicates volumes.

In step S 905, the utterance recording unit 302 sets an operator speech state as "speaking". The utterance recording unit 302 changes the "not yet speaking" to "speaking" in an operator speech storage area.

In step S 906, the utterance recording unit 302 refers to the operator speech storage area and determines whether or not the operator is speaking. When the operator is speaking (Yes), it moves on to step S 907, and when the operator is not speaking (No), it finishes the operator speech extracting processing and moves on to the subsequent customer speech extracting processing.

In step S 907, the utterance recording unit 302 records, in speech date and hour information, the current date and hour and information indicating that the customer has started an instance of speech. For example, it records the speech date and hour information 307 as depicted in FIG. 11. The information which indicates that the operator has finished speaking is "operator speech finish".

In step S 908, the utterance recording unit 302 sets an operator speech state as "not yet speaking". The utterance recording unit 302 changes "speaking" to "not yet speaking" in the operator speech storage area.

FIG. 10 illustrates one example of an operation of customer speech extracting processing.

In step S 1001 of FIG. 10, the utterance recording unit 302 obtains a maximum volume value V2 using the utterance data of the customer for cycles obtained for each prescribed cycle. For example, the utterance recording unit 302 obtains the utterance data of the customer for 20 milliseconds for each 20 millisecond cycle, analyzes the data indicating the volume included in the utterance data for 20 milliseconds, and obtains the maximum volume value V2. The cycle is not limited to 20 milliseconds, however.

In step S 1002, the utterance recording unit 302 compares the maximum volume value V2 with the prescribed volume value V0 for each prescribed cycle and determines whether or not V2 is greater than V0. When V2 is greater than V0 (Yes), it moves on to step S 1003, and when V2 is not greater than V0 (No), it moves on to step S 1008. Here, a silence value V0 is a volume which is considered silence. The silence value V0 may be obtained by measuring noise in idle states, and defining the average of the measured values as the silence value V0.

In step S 1003, the utterance recording unit 302 refers to a customer speech storage area and determines whether or not the speech has not been started. When the speech has not yet been started (Yes), it moves on to step S 1004, and otherwise (No), moves on to step S 1007.

In step S 1004, the utterance recording unit 302 records, in the speech date and hour information, the current date and hour and the information indicating that the customer has started speaking. For example, it records the speech date and hour information 307 as depicted in FIG. 11. The information which indicates that the customer has started speaking is the "customer speech start".

In step S 1005, the utterance recording unit 302 changes the total volume value V2S to the maximum volume value V2. That is to say, when the previous state is in a not yet speaking state, the maximum volume value V2 is substituted for initializing the total volume value V2S.

In step S 1006, the utterance recording unit 302 sets the customer speech state as "speaking". The utterance recording unit 302 changes the "not yet speaking" to "speaking" in the customer speech storage area.

In step S 1007, the utterance recording unit 302 changes the total volume value V2S to V2S+V2. That is to say, when the previous state is in a speaking state, the maximum volume value V2 obtained in the present cycle is added to the previous total volume value V2S and the added value is defined as the total volume value V2S.

In step S 1008, the utterance recording unit 302 refers to the customer speech storage area and determines whether or not the customer is speaking. When the customer is speaking (Yes), it moves on to step S 1009, and when the customer is not speaking (No), it finishes the customer speech extracting processing.

In step S 1009, the utterance recording unit 302 records, in the speech date and hour information, the current date and hour and the information indicating that the operator has finished speaking. For example, it records in the "date and hour" and "event type" the speech date and hour information 307 as depicted in FIG. 11. The information which indicates that the customer has finished speaking is "customer speech finish".

In step S 1010, the utterance recording unit 302 obtains an average volume value V3 in an instance of speech. The average volume value V3 in an instance of speech is obtained by using the expression of the total volume value V2S/(date and hour of the customer speech finish-date and hour of the customer speech start)×the number of samples. The number of samples is a quantity of data obtained by sampling the customer utterances in a predetermined cycle. That is, it is the number of samples in a cycle.

In step S 1011, the utterance recording unit 302 stores, in an "average volume in a speech" of the speech date and hour information 307, the average volume value V3 in a speech. In the present example, the average volumes V3 "31", "32", "12", "58", and "34" are stored, associated with the date and hour of the customer speech finish.

In step S 1012, the utterance recording unit 302 sets a customer speech state as "not yet speaking". The utterance recording unit 302 changes the "speaking" to "not yet speaking" in the customer speech storage area.

Explanation is given for an operation of an analyzing unit 303.

Figure 12A:
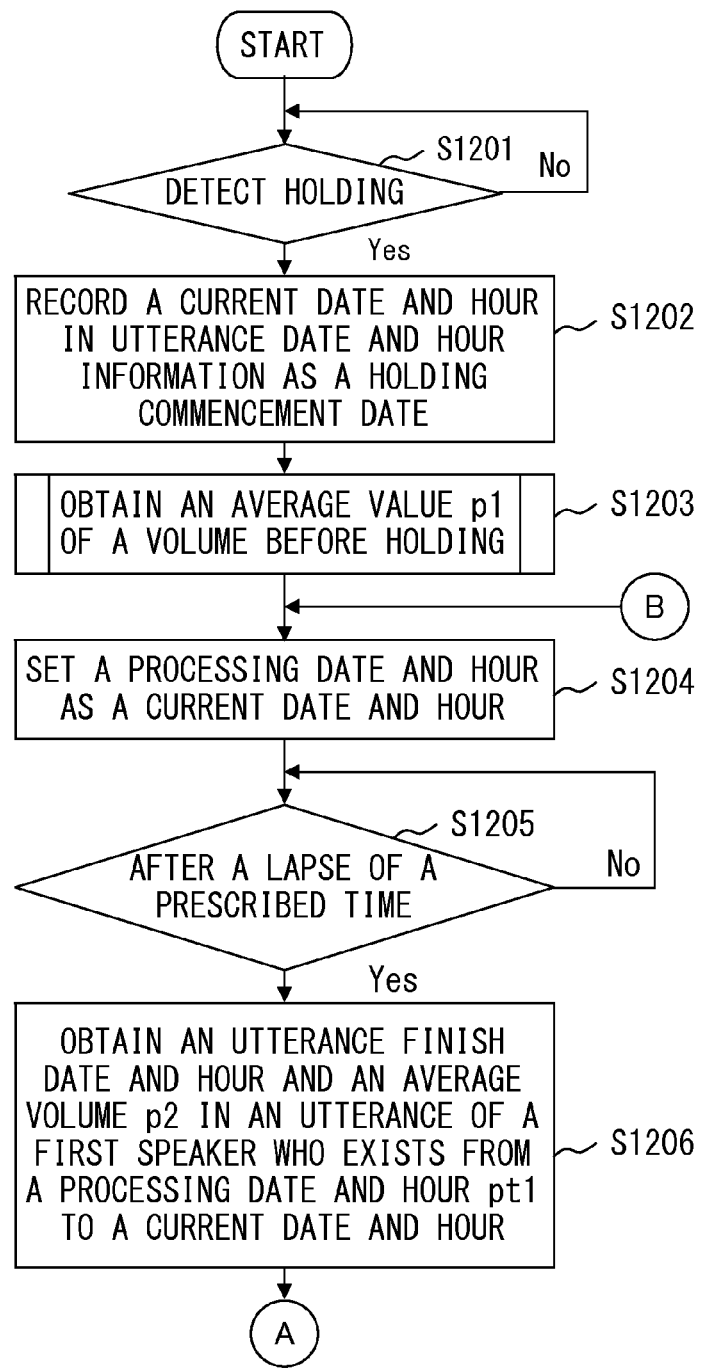

FIGS. 12A and 12B illustrate one example of an operation of an analyzing unit in an embodiment 1. In step S 1201, the analyzing unit 303 receives a holding notice which indicates the holding commencement transmitted from the operator terminal 3 and detects that it is in a holding state. The holding notice for the holding commencement is reported to the operator terminal 3 via the input-output interface 404 to set holding state commencing from the holding input unit 501, when the operator sets the communications to a holding state. When receiving the notice, the controlling unit 401 generates the holding notice which indicates a holding commencement and transmits the notice to the connecting unit 301. The connecting unit 301 transmits the received holding notice to the analyzing unit 303. After receiving the received holding notice, the analyzing unit 303 analyzes the holding notice and detects that it is a holding commencement.

Next, the analyzing unit 303 determines whether or not it is a holding commencement (indicating being on hold), and when it detects the holding commencement (Yes), it moves on to step S 1202, and when it doesn't (No), the analyzing unit 303 waits until it detects the holding commencement.

In step S 1202, the analyzing unit 303 records, in the speech date and hour information, the current date and hour as the holding commencement date and hour. In the example of the date and hour information 307 in FIG. 11, as the holding commencement date and hour in the call ID "7840128", "2010/1/1 10:24:47", which indicates the time 10:24 and 47 seconds, Jan. 1$^{st}$, 2010, is recorded. In addition, the "holding commencement" is recorded for each associated event type.

In step S 1203, the analyzing unit 303 obtains the average value p1 of the volume before holding. The calculation processing of the average speech volume value before holding will be discussed later.

In step S 1204, the analyzing unit 303 sets the on-hold current date and hour as the processing date and hour pt1.

In step S 1205, the analyzing unit 303 determines whether or not a prescribed time has lapsed and when the prescribed time has lapsed (Yes), it moves on to step S 1206, and when it has not (No), it waits until the prescribed time lapses.

In step S 1206, the analyzing unit 303 obtains a speech finish date and hour and the average volume value p2 in an instance of speech of the customer existing from the processing date and hour pt1 to the current date and hour. In the example of the date and hour information 307 in FIG. 11, the analyzing unit 303 obtains the average volume value V3 in an instance of speech which is associated with the "customer speech finish" from the processing date and hour pt1 to the current date and hour which is in a time period from the "holding commencement" to the "holding release" in the event type.

In step S 1207, when the analyzing unit 303 cannot obtain the date and hour of customer speech finish from the speech date and hour information (Yes), it moves on to step S 1212, and otherwise (No), it moves on to step S 1208. That is, when the analyzing unit 303 cannot obtain the date and hour of the customer speech finish from the speech date and hour information, it moves on to step S 1212 for obtaining the date and hour of the customer speech finish.

In step S 1208, the analyzing unit 303 compares the average volume value p2 in an instance of speech with the average volume value p1 before holding, and when p2 is greater than p1 (Yes), it moves on to step S 1209, and when p2 is not greater than p1 (No), it moves on to step S 1212. When p2 is greater than p1, it is assumed that the customer is dissatisfied with the operator, since the customer is murmuring aloud in a louder voice than before holding. On the other hand, when p2 is not greater than p1, it is assumed that the customer is not dissatisfied with the operator.

In step S 1209, the analyzing unit 303 determines whether or not it is before a lapse of a marginal time and when it is before a lapse of a marginal time (Yes), it moves on to step S 1210, and when it is after a lapse of a marginal time (No), it moves on to step S 1211. The marginal time is the threshold value used for comparing the time from the holding commencement date and hour with the current time, and is recorded in the storing unit 202. The marginal time is the time at which the customer starts to indicate dissatisfaction for having waited, for example, in a holding state, and it is the value determined by examination results in the past and the like. Therefore, before a lapse of a marginal time is the state in which the customer has not yet indicated any dissatisfaction, while after a lapse of a marginal time it is assumed that the customer is dissatisfied for having waited in the holding state.

In step S 1210, the analyzing unit 303 writes "1" in an emotion flag. In the present example, when "1" is written in the emotion flag, it indicates that the customer is dissatisfied with the operator response per se.

In step S 1211, the analyzing unit 303 writes "2" in an emotion flag. In the present example, when "2" is written in the emotion flag, it indicates that the customer is dissatisfied with having waited for a long time on hold.

When there are several holding states during communications, and when both "1" and "2" are written in the emotion flag, this indicates that the customer is dissatisfied with the operator response per se and that the customer is dissatisfied with having waited for a long time on hold. In addition, the emotion flag is an area in which the storage area of the emotion flag is secured in the storing unit 202 as temporary and in which the value corresponding to the psychological state of the customer is written. In the present examples, the psychological state of the customer is indicated by dissatisfaction degrees "1" and "2".

In step S 1212, the cognitive analyzing unit 303 receives a holding notice indicating the holding release transmitted from the operator terminal 3 and detects that the holding is in a released state. The holding notice for holding release is reported to the operator terminal 3 via the input-output interface 404 to set a holding state commencing from the holding input unit 501, when the operator releases the holding during communications. When receiving the notice, the controlling unit 401 generates the holding notice, which indicates a holding release and transmits the holding notice to the connecting unit 301. The connecting unit 301 transmits the received holding notice to the analyzing unit 303. After receiving the received holding notice, the analyzing unit 303 analyzes the holding notice and detects that it is a holding release.

Next, the analyzing unit 303 determines whether or not the holding notice is a holding release, and when it detects the holding release (Yes), it moves on to step S 1213, and when it doesn't (No), it moves on to step S 1204.

In step S 1213, the analyzing unit 303 refers to the emotion flag and determines whether or not the value in accordance with the psychological state of the customer is stored in the emotion flag. When the value is stored in the emotion flag (Yes), it moves on to step S 1214, and when it isn't (No), it finishes the processing and waits for the subsequent holding commencement.

In step S 1214, the analyzing unit 303 reports, to the instructing unit 304, the response instruction notice which includes information indicated by the emotion flag. Next, the instructing unit 304 receives the response instruction notice, selects from the response information 308 the message information (determination information) for supporting the operator who responds to the information indicated by the emotion flag, and transmits the selected message information to the operator terminal 3 via the connecting unit 301.

Figure 13A:
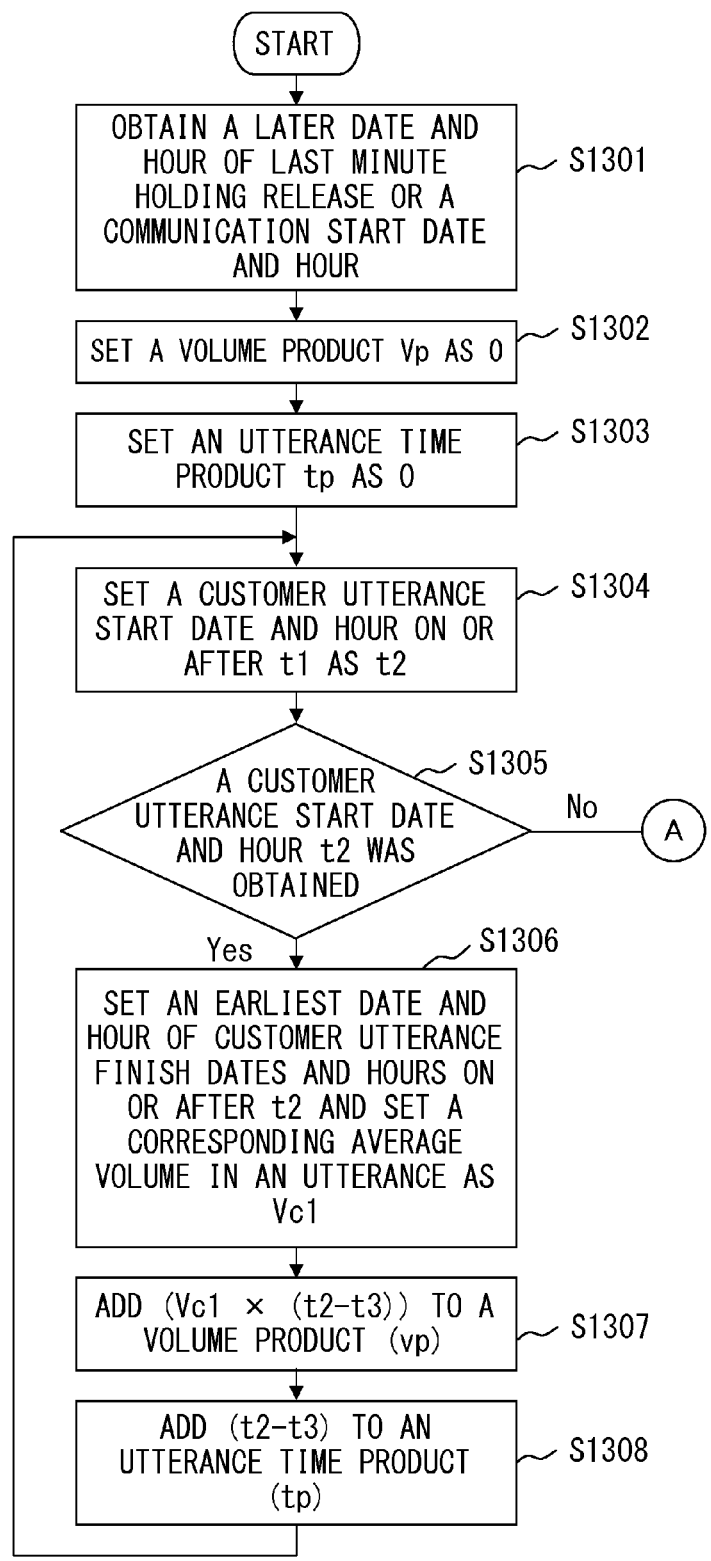
FIGS. 13A and 13B illustrate one example of an operation of calculation processing of average speech volume before holding.
Figure 13B:
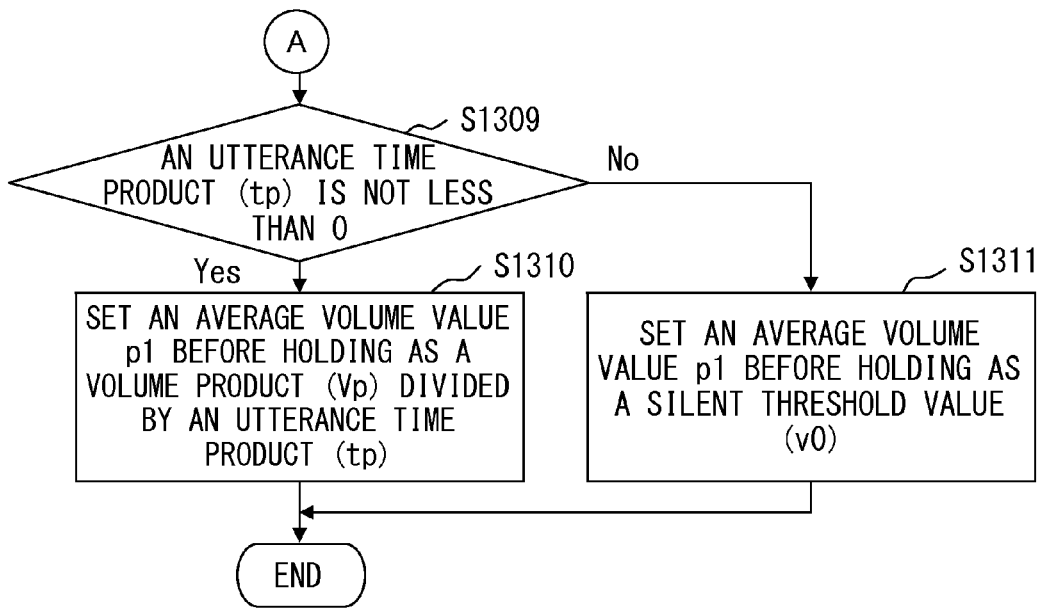

FIGS. 13A and 13B illustrate one example of an operation of calculation processing of average speech volume before holding. In step S 1301, the analyzing unit 303 obtains the later date and hour of the last minute holding release or the communication start date and hour from the speech date and hour information to define the obtained value as t1. When obtaining the later date and hour of the last minute holding release, if there occur several holding states intermittently during the communications, the analyzing unit 303 obtains the date and hour of the holding release of the holding state with the latest date and hour. Further, when the holding state has not yet been generated, the analyzing unit 303 obtains the communication start date and hour.

In step S 1302, the analyzing unit 303 sets a volume product Vp as 0, and in step S 1303, the analyzing unit 303 sets a speech time product tp as 0 and substitutes the initial value.

In step S 1304, the analyzing unit 303 sets the date and hour of the customer speech start on or after t1 as t2. In the example of the date and hour information 307 depicted as FIG. 11, when setting "2010/1/1 10:23:43" as t1, which is the speech start date and hour, "2010/1/1 10:23:59" and "2010/1/1 10:24:03" become t2.

In step S 1305, the analyzing unit 303 determines whether or not the analyzing unit 303 could receive t2, and when it could (Yes), it moves on to step S 1306, and when it couldn't, it moves on to step S 1309. The state at which the analyzing unit 303 could obtain t2 is a state at which the customer has not yet spoken.

In step S 1306, the analyzing unit 303 sets the earliest date and hour as t3 if the dates and hours of the customer speech finish on or after t2, and sets the average volume in a speech which corresponds to the date and hour as Vc1. In the example of the speech date and hour information 307 in FIG. 11, when t2 is set as "2010/1/1 10:23:59", since the earliest date and hour of the finishing dates and hours of the customer speech on or after t2 becomes "2010/1/1 10:24: 01", the "2010/1/1 10:24:01" is set as t3. Further, "31", which is the average volume in a speech associated with the "2010/1/1 10:24:01", is set as Vc1.

In step S 1307, the analyzing unit 303 adds (Vc1×(t2−t3)) to the volume product value Vp. In step S 1308, the analyzing unit 303 adds (t2−t3) to the speech time product value tp.

In step S 1309, the analyzing unit 303 determines whether or not the speech time product value tp is not less than 0, and when the tp is not less than 0 (Yes), it moves on to step S 1310, and when the tp is less than 0 (No), it moves on to step S 1311.

In step S 1310, the analyzing unit 303 obtains the value by dividing the volume product value Vp by the speech time product value tp and sets it as the average volume value p1 before holding. Further, in step S 1311, the analyzing unit 303 sets the average volume value p1 before holding as a silent value V0.

In addition, as a technology for recognizing emotions by quantifying variation information of a volume power, by using the volume power information of utterances, a technology such as that disclosed in Japanese Laid-open Patent Publication No. 2004-317822, and the like, may be used.

Explanation is given for a method of analyzing the utterance features of the customer in embodiment 2, using FIG. 14A and FIG. 14B.

FIG. 14A and FIG. 14B illustrate a time chart of one example of a method of analyzing utterance features of a customer in an embodiment 1. The average volume value p1 before holding obtained in a flow diagram depicted as FIG. 13B indicates the average volume value p1 before holding (the value between dotted lines) during the time before holding of the time chart (t1-holding commencement) depicted as FIG. 14A and FIG. 14B. The time chart depicted as FIG. 14A is a time chart when "1" is written in the emotion flag obtained in the flow diagram depicted as FIG. 12B. Since the average volume value p2 in an instance of speech is larger than the average volume value p1 before holding, the time chart indicates that the customer is dissatisfied with the operator response per se.

The time chart depicted as FIG. 14B. is a time chart when "2" is written in the emotion flag obtained in the flow diagram depicted as FIG. 12B, in step S 1211. Since the average volume value p2 in an instance of speech is larger than the average volume value p1 before holding after a lapse of a marginal time, the time chart indicates that the customer is dissatisfied with having waited for a long time on hold.

Explanation is given for a message displayed on a side of an operator terminal 3.

The instructing unit 304 receives the response instruction notice, selects, from response information 308, the message information for supporting the operator who responds to information indicated by the emotion flag, and transmits the selected message information to the operator terminal 3 via the connecting unit 301. FIGS. 15A, 15B, 15C and 15D illustrate one example of a data structure of a message content and response information. The response information 308 of FIG. 15D has an "emotion flag" and "message information". In the "emotion flag", identifiers indicating the psychological state of the customer stored in the emotion flag are recorded. In the present example, "1", "2", "1, 2", and the like, which indicate dissatisfaction levels, are recorded. In the "message information", the messages for supporting the operator are recorded associated with the emotion flag. In the present example, "mes_1", "mes_2", and "mes_3", which correspond to messages 1501, 1502, and 1503 depicted as FIGS. 15A, 15B and 15C, are recorded, respectively.

Next, when the message information transmitted from the communication support device 1 is received, the message for supporting the operator as depicted as FIGS. 15A, 15B and 15C is displayed on the display, which is the output unit of the input-output unit 408 connected to the operator terminal 3. A message 1501 is the message which is selected when "1" is recorded in the emotion flag. When "1" is in the emotion flag, the message 1501 sends such messages as "In reality, the customer seems dissatisfied with your response", "Please consider a true intent of the customer and restart conversation", and the like, since the customer is dissatisfied with the operator response per se.

A message 1502 is the message which is selected when "2" is recorded in the emotion flag. When "2" is in the emotion flag, the message 1502 sends such messages as "The customer seems dissatisfied with prolonged holding." or "Please restart conversation by stating 'We do apologize to have kept you waiting so long' first", and the like, since the customer is dissatisfied with a long holding state.

A message 1503 is the message which is selected when both "1" and "2" are recorded in the emotion flag. When both "1" and "2" are in the emotion flag, since it indicates that the customer is dissatisfied with the operator response per se and with having waited for a long time, the message 1503 sends such messages as "In reality, the customer seems dissatisfied with your response. The customer also seems dissatisfied with prolonged holding. Please consider a true intent of the customer and restart conversations by stating 'We do apologize to have kept you waiting so long' first".

According to embodiment 1, by obtaining the utterances expressed by the customer in a holding state as instructed by the operator during the communications, by analyzing the obtained utterance features, and by measuring the psychological state of the customer on the basis of the analytical result, accuracy in measuring the psychological state of the customer may be enhanced. That is to say, it is assumed that the customer, while on hold, since he is not aware that his own conversation is being transmitted to the operator, is frankly expressing his real emotions, such as dissatisfaction or the like, by murmuring aloud, clucking, sighing, or the like. Accordingly, by obtaining the utterances expressed by the customer in a holding state which was not utilized for measuring the psychological state of the customer in the past, and by performing the later mentioned analytical processing on the obtained utterance features, accuracy in measuring the psychological state of the customer may be enhanced. Further, by enhancing the accuracy in measuring the psychological state of the customer, the instructions by the operator may become appropriate to the psychological state of the customer.

Explanation is given for embodiment 2.

In the storing unit 202 of embodiment 2, specific expressions indicating a specific psychological state or specific expressions estimated for indicating a specific psychological state are stored.

The analyzing unit 303 of embodiment 2 refers to the storing unit 202 and determines whether or not specific expressions are included in the utterance information of the customer in the holding state. The analyzing unit 303 of embodiment 2 performs the utterance recognition processing on the utterances during the time corresponding to the holding state, and determines, for example, whether or not the dissatisfaction words recorded in the dissatisfaction word information indicating that the customer is dissatisfied are included in the utterances. As specific expressions indicating a specific psychological state or specific expressions estimated for indicating a specific psychological state, dissatisfaction word information, which indicates that the customer is dissatisfied, is considered.

The instructing unit 304 of embodiment 2 outputs, to the operator terminal 3, the message information (determination information) related to the psychological state of the customer based on the determination result of whether or not specific expressions are included. Further, the instructing unit 304 of embodiment 2 outputs, to the operator terminal 3, the determination information indicating that the customer is dissatisfied with the holding state, when the analyzing unit 303 determines that the specific expressions are included in the utterance information of the customer, after a lapse of a prescribed time from a time of a shift to a holding state.

Figure 16:
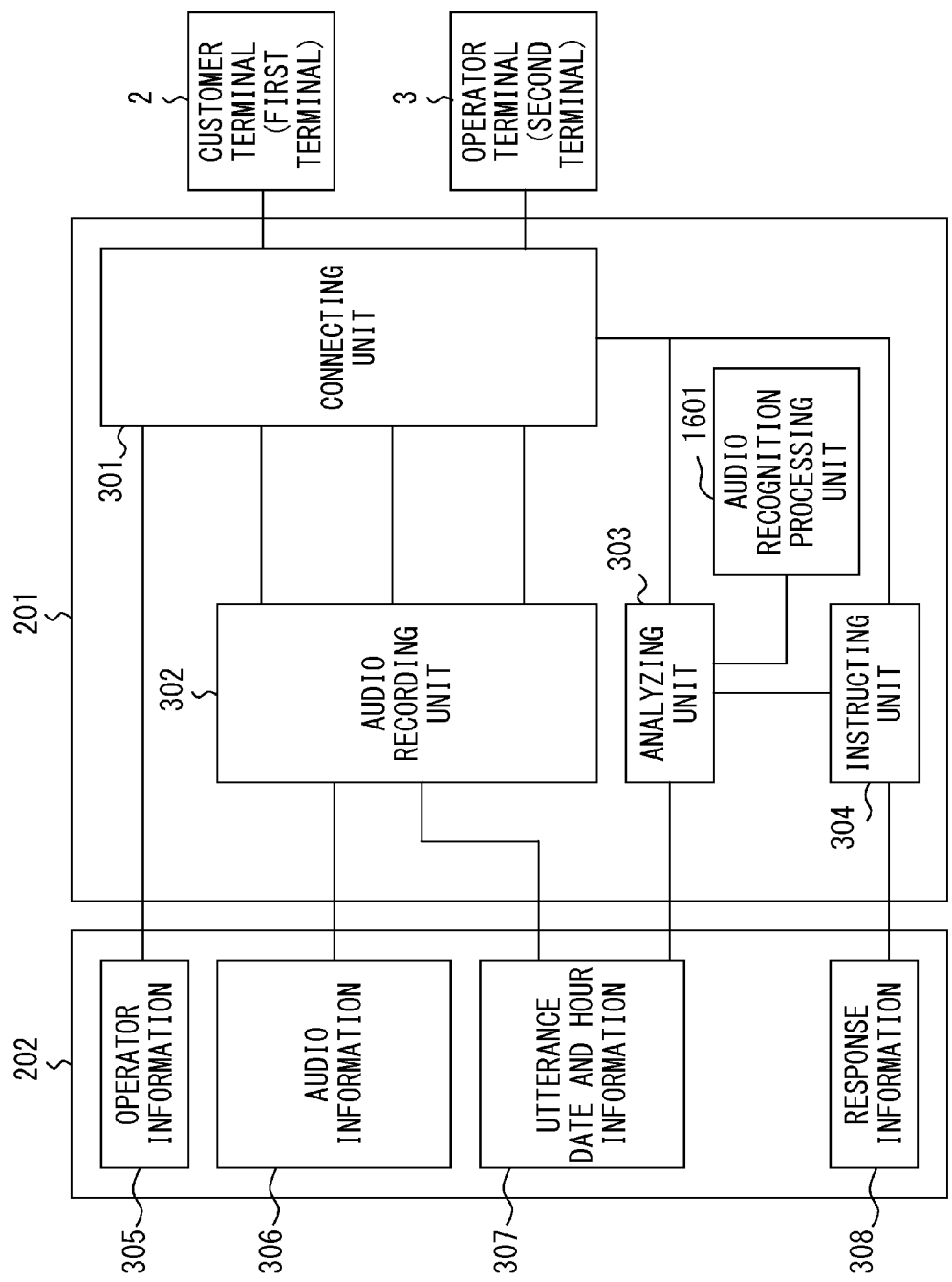
FIG. 16 illustrates one example of a function of a controlling unit and a storing unit in an embodiment 2.

FIG. 16 illustrates one example of a function of a controlling unit and a storing unit in an embodiment 2. The controlling unit 201 of FIG. 16 has a connecting unit 301, an utterance recording unit 302, an analyzing unit 303, an instructing unit 304, an utterance recognition processing unit 1601, and the like. The explanations for the connecting unit 301, the utterance recording unit 302, and the instructing unit 304 are omitted, since the explanations have already been given in embodiment 1.

Explanation is given for the analyzing unit 303 of embodiment 2.

Figure 17A:
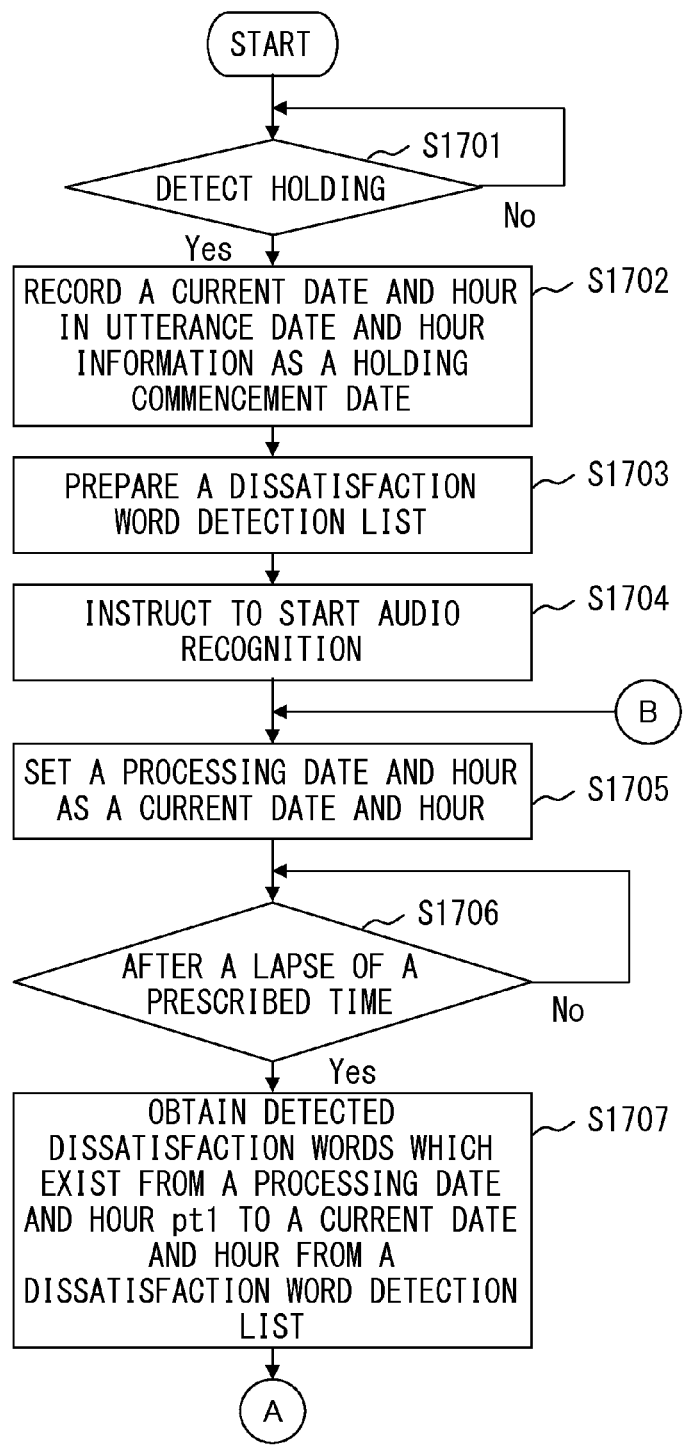
FIGS. 17A and 17B illustrate one example of an operation of an analyzing unit in an embodiment 2.
Figure 17B:
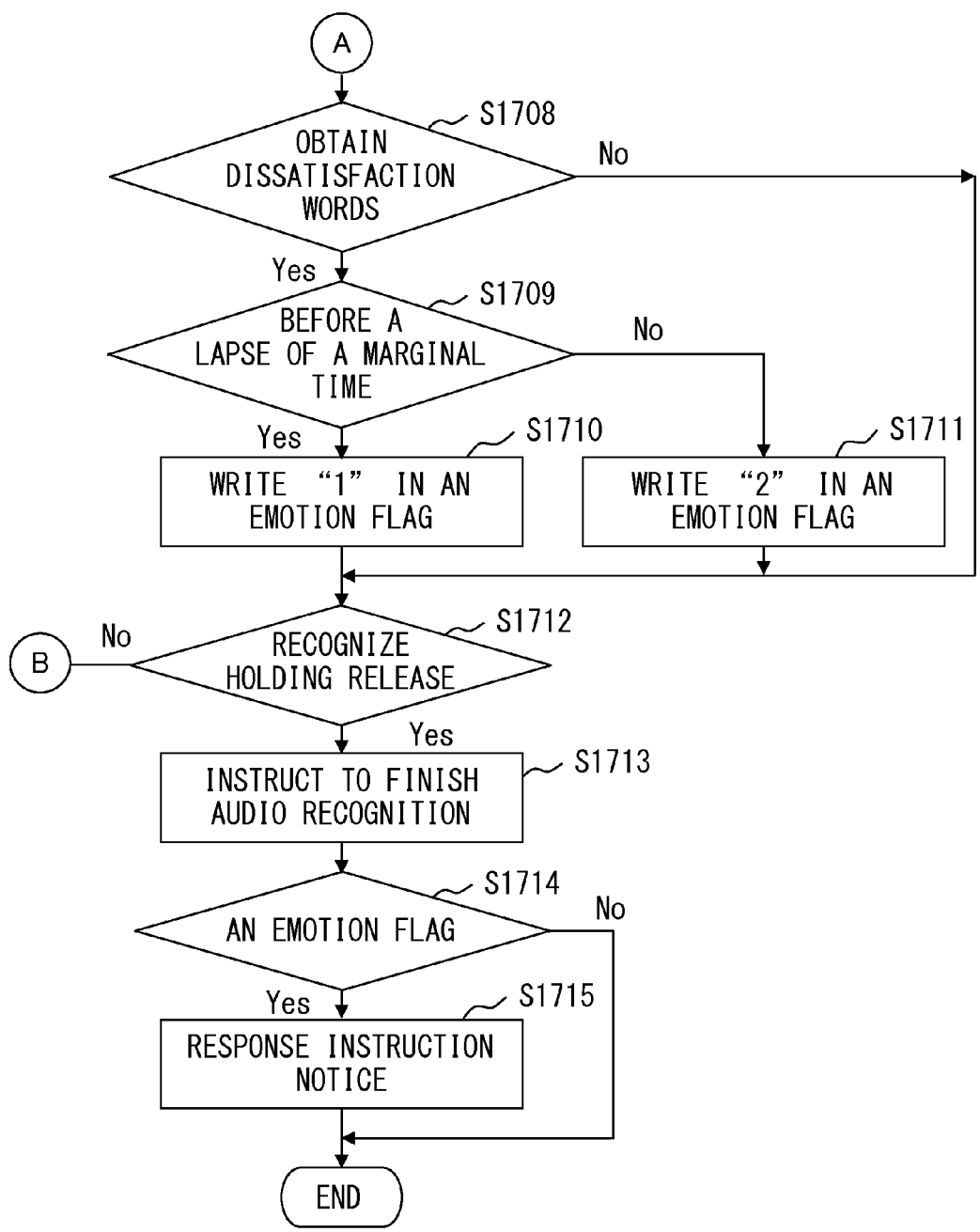

FIGS. 17A and 17B illustrate one example of an operation of an analyzing unit in an embodiment 2. In step S 1701, the analyzing unit 303 receives the holding notice which indicates the holding commencement transmitted from the operator terminal 3 and detects that it is in the holding state. The holding notice of the holding commencement reports, to the operator terminal 3, via the input-output interface 404, to set a holding state commencing from the holding input unit 501, when the operator sets the communications to a holding state. When the controlling unit 401 receives the holding notice, the controlling unit 401 generates a holding notice indicating the holding commencement and transmits the holding notice to the connecting unit 301. The connecting unit 301 transmits the received holding notice to the analyzing unit 303. The analyzing unit 303, after receiving the holding notice, analyzes the holding notice and detects that it is the holding commencement.

Next, the analyzing unit 303 determines whether or not it is the holding commencement (which indicates being on hold), and when the analyzing unit 303 detects the holding commencement, it moves on to step S 1702, and when it doesn't (No), it waits until the holding commencement is detected.

In step S 1702, the analyzing unit 303 records, in the speech date and hour information, the current date and hour as the date and hour of the holding commencement. For example, in the example of the speech date and hour information 307 in FIG. 11, as the date and hour of holding commencement in the call ID "7840128", "2010/1/1 10:24: 47", which indicates a time of 10:24 and 47 seconds, Jan. 1$^{st}$, 2010, is recorded. In addition, the "holding commencement" is recorded for each type of related event.

In step S 1703, the analyzing unit 303 prepares dissatisfaction word detection information as a storage area for recording the dissatisfaction words detected by utterance recognition processing. In FIG. 18A, dissatisfaction word detecting information 1801 is indicated. The dissatisfaction word detection information 1801 has "detection dates and hours" and "detection keywords". In the "detection dates and hours", the dates and hours of detecting dissatisfaction words are stored. In the present example, "2010/1/1 10:24:55", "2010/1/1 10:24:59", and the like are stored as the dates and hours of detecting the dissatisfaction words. In the "detection keywords", the detected dissatisfaction words are recorded associated with the dates and hours of detecting the dissatisfaction words. In the present example, "disgusted", "irritated", and the like are stored as the dissatisfaction words.

In step S 1704, the analyzing unit 303 reports the instruction to start the utterance recognition processing to the utterance recognition processing unit 1601. This utterance recognition processing will be described later.

In step S 1705, the analyzing unit 303 defines the current date and hour while being on hold as the processing date and hour pt1.

In step S 1706, the analyzing unit 303 determines whether or not a prescribed time has lapsed and when it has (Yes), it moves on to step S 1206, and when it hasn't (No), it waits until the prescribed time lapses.

In step S 1707, the analyzing unit 303 obtains, from the dissatisfaction word detecting information, the detected dissatisfaction words existing from the processing date and hour pt1 to the current date and hour.

In step S 1708, the analyzing unit 303 determines whether or not it has obtained dissatisfaction words from the dissatisfaction word detecting information, and when it has (Yes), it moves on to step S 1709, and when it hasn't (No), it moves on to step S 1712.

In step S 1709, the analyzing unit 303 determines whether or not it is before a lapse of a marginal time, and if it is before a lapse of a marginal time (Yes), it moves on to step S 1710, and if it is after a lapse of a marginal time (No), it moves on to step S 1711. The marginal time is a threshold value used for comparing the current on-hold time from the holding commencement, and is recorded in the storing unit 202. The marginal time is the time at which the customer starts to indicate dissatisfaction for having waited, for example, in a holding state, and it is the value determined by examination results in the past, and the like. Accordingly, before a lapse of the marginal time refers to a state in which the customer has not indicated dissatisfaction, and if the marginal time has lapsed, it is assumed that the customer is dissatisfied with having waited in a holding state.

In step S 1710, the analyzing unit 303 writes "1" in the emotion flag. In the present example, when "1" is written in the emotion flag, it indicates that the customer is dissatisfied with the operator response per se.

In step S 1711, the analyzing unit 303 writes "2" in the emotion flag. In the present example, when there is "2" in the emotion flag, it indicates that the customer is dissatisfied with having waited for a long time on hold.

When there are several holding states during a call, and if both "1" and "2" are written in the emotion flag, it indicates that the customer is dissatisfied with the operator response per se and that the customer is also dissatisfied with having waited for a long time on hold. In addition, the emotion flag is an area in which the storage area of the emotion flag is secured in the storing unit 202 as temporary and in which the value which corresponds to the psychological state of the customer is written. In the present example, the psychological state of the customer is indicated by the dissatisfaction degrees "1" and "2".

In step S 1712, the cognitive analyzing unit 303 receives a holding notice indicating the holding release transmitted from the operator terminal 3 and detects that the holding is in a released state. The holding notice for the holding release is reported from the holding input unit 501 to the operator terminal 3 via the input-output interface 404 to set to release a holding state, when the operator releases the holding during communications. When receiving the holding notice, the controlling unit 401 generates the holding notice, which indicates a holding release, and transmits the holding notice to the connecting unit 301. The connecting unit 301 transmits the received holding notice to the analyzing unit 303. After receiving the received holding notice, the analyzing unit 303 analyzes the holding notice and detects that it is a holding release.

Next, the analyzing unit 303 determines whether or not it is the holding release, and when it is the holding release (Yes), it moves on to step S 1713, and when it is not (No), it moves on to step S 1705.

In step S 1713, the analyzing unit 303 reports the instruction to finish the utterance recognition processing to the utterance recognition processing unit 1601.

In step S 1714, the analyzing unit 303 refers to the emotion flag and determines whether or not the value in accordance with the psychological state of the customer is stored in the emotion flag. When the value is stored in the emotion flag (Yes), it moves on to step S 1715, and when it isn't (No), it finishes the processing and waits for the subsequent holding commencement.

In step S 1715, the analyzing unit 303 reports, to the instructing unit 304, the response instruction notice, which includes information indicated by the emotion flag. Next, the instructing unit 304 receives the response instruction notice, selects the message information (determination information) for supporting the operator who corresponds to the information indicated by the emotion flag from the response information 308, and transmits the selected message information (determination information) to the operator terminal 3 via the connecting unit 301.

FIG. 19 illustrates one example of an operation of utterance recognition processing. In step S 1901, the utterance recognition processing unit 1601 receives the instruction to start the utterance recognition from the analyzing unit 303. When the utterance recognition processing unit 1601 has received the instruction (Yes), it moves on to step S1902, and when it hasn't (No), it waits for receipt.

In step S 1902, the utterance recognition processing unit 1601 reads the dissatisfaction keyword information 1802 of FIG. 18B. The dissatisfaction keyword information 1802 is, for example, a table and the like with registered dissatisfaction words and is stored in the storing unit 202. The dissatisfaction keyword information 1802 stores "disgusted", "be quick", "irritated", and "pull yourself together", and the like, as dissatisfaction words.

In step S 1903, the utterance recognition processing unit 1601 performs the utterance recognition processing. Here, the utterance recognition processing is the processing of detecting whether or not the designated keywords (dissatisfaction keyword information 1802) are included in the utterance waveform. The utterance recognition processing unit 1601 specifies, for example, the features of the utterance waveform when pronounced for each of the dissatisfaction words registered in the dissatisfaction keyword information 1802. This specifying processing may be performed prior to the utterance recognition processing of the actual customer speech, and may be stored in the storing unit for the utterance recognition processing. Then, the utterance recognition processing unit 1601 detects whether or not the dissatisfaction words are included, by comparing the features of the utterance waveform of each dissatisfaction word stored in the storing unit with the utterance waveform of the actual customer speech. Such processing uses the utterance recognition processing as disclosed, for example, in Japanese Laid-open Patent Publication No. 2005-142897 and Japanese Laid-open Patent Publication No. 2008-53826, and the like.

In step S 1904, it is determined whether or not the utterance recognition processing unit 1601 has detected the dissatisfaction words, and when it has (Yes), it moves on to step S 1905, and when it hasn't (No), it moves on to step S 1906.

In step S 1905, the dissatisfaction words detected by the utterance recognition processing unit 1601 are associated with the date and hour of detecting the dissatisfaction words, and are recorded in the dissatisfaction word detecting information 1801.

In step S 1906, the utterance recognition processing unit 1601 determines whether or not it received from the analyzing unit 303 the instruction for completing the utterance recognition processing, and if it did (Yes), it stops the utterance recognition processing, and if it didn't (No), it moves on to step S 1903. In other words, when the holding state is released, it stops the utterance recognition processing. The utterance recognition processing unit 1601 obtains the dissatisfaction word detecting information 1801.

Explanation is given for a method of analyzing the utterance features of the customer in embodiment 2, using FIG. 20A and FIG. 20B.

FIG. 20A and FIG. 20B illustrate a time chart of one example of a method of analyzing the utterance features of the customer in embodiment 2. The time chart depicted as FIG. 20A is the time chart when "1" is written in the emotion flag obtained in the flow diagram depicted as FIG. 17B. Since the word "disgusted" expressing dissatisfaction is detected in the customer utterances while on hold, it indicates that the customer is dissatisfied with the operator response per se.

In step S 1711, the time chart depicted as FIG. 20B is the time chart when "2" is written in the emotion flag obtained in the flow diagram depicted as FIG. 17B. Since the word "disgusted" expressing dissatisfaction is detected in the customer utterances while on hold after a lapse of a marginal time, it indicates that the customer is dissatisfied with having waited for a long time on hold.

Explanation is given for a message displayed on the side of the operator terminal 3.

The instructing unit 304 receives a response instruction notice, selects, from the response information 308, message information for supporting the operator who responds to information indicated by the emotion flag, and transmits the selected message information to the operator terminal 3 via the connecting unit 301. When the operator terminal 3 receives the message information transmitted from the communication support device 1, the message for supporting the operator depicted as FIGS. 15A, 15B and 15C is displayed on the display, which is the output unit of the input-output unit 408 connected to the operator terminal 3.

According to embodiment 2, by obtaining the utterances expressed by the customer in a holding state instructed by the operator during the communications, by analyzing the obtained utterance features, and by measuring the psychological state of the customer based on the analytical result, accuracy in measuring the psychological state of the customer may be enhanced. That is to say, it is assumed that the customer, while on hold, since he is not aware that his own conversation is being transmitted to the operator, is frankly expressing his real emotions such as dissatisfaction or the like by murmuring aloud, clucking, or sighing, or the like.

Accordingly, by obtaining the utterances expressed by the customer in a holding state which was not utilized for measuring the psychological state of the customer in the past, and by performing the analytical processing to the obtained utterance features, accuracy in measuring the psychological state of the customer may be enhanced. Further, by enhancing the accuracy in measuring the psychological state of the customer, the instructions by the operator may become appropriately correspondent to the psychological state of the customer.

Further, the present invention is not limited to the above mentioned embodiments, and various modifications or changes may be made without departing from the scope of the present invention. Each embodiment may be combined with the others as long as there is no inconsistency in processing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a indicating of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication support device for supporting a second speaker in a communication performed between a first terminal used by a first speaker and a second terminal used by the second speaker, the communication support device comprising:
    a processor
        that detects a holding state of the communication,
        that compares utterance information of the first speaker in the holding state and the utterance information of the first speaker before the holding state when the holding state is detected, the utterance information of the first speaker being obtained by telephone equipment used by the first speaker in the communication performed between the first terminal and the second terminal, and
        that outputs information concerning an emotion of the first speaker based on the comparison result; and
    a storing unit that stores the utterance information of the first speaker in the communication performed between the first terminal and the second terminal,
    wherein the processor
        refers to the storing unit, compares a first average value of an utterance level of the utterance information of the first speaker in the holding state with a second average value of the utterance level of the utterance information of the first speaker before the holding state, and
        outputs to the second terminal determination information on a psychological state of the first speaker based on the comparison result of the first average value and the second average value.

2. The communication support device according to claim 1, wherein the processor compares the first average value and the second average value after a lapse of a prescribed time from a time of a shift to the holding state.

3. The communication support device according to claim 1,
the storing unit further stores a specific expression indicating a specific psychological state or a specific expression estimated to indicate a specific psychological state, and
wherein the processor further
refers to the storing unit,
determines whether or not the specific expression is included in the utterance information of the first speaker in the holding state, and
outputs to the second terminal determination information on a psychological state of the first speaker based on the determination result of whether or not the specific expression is included.

4. The communication support device according to claim 3, wherein the processor outputs to the second terminal the determination information indicating that the first speaker is dissatisfied with the holding state, when the specific expression is determined to be included in utterance information of the first speaker after a lapse of a prescribed time from a time of a shift to the holding state.

5. The communication support device according to claim 1, wherein the processor outputs to the second terminal the determination information on an action to be taken by the second speaker for the first speaker based on the utterance information of the first speaker.

6. A communication support method for supporting a second speaker in a communication performed by a computer between a first terminal used by a first speaker and a second terminal used by the second speaker, the computer performing a process comprising:
detecting a holding state of the communication;
comparing utterance information of the first speaker in the holding state and the utterance information of the first speaker before the holding state when the holding state is detected, the utterance information of the first speaker being obtained by telephone equipment used by the first speaker in the communication performed between the first terminal and the second terminal;
outputting information concerning an emotion of the first speaker based on a result of the comparing;
referring to a storing unit that stores the utterance information of the first speaker in the communication performed between the first terminal and the second terminal;
comparing a first average value of an utterance level of the utterance information of the first speaker in the holding state with a second average value of the utterance level of the utterance information of the first speaker before the holding state; and
outputting to the second terminal determination information on a psychological state of the first speaker based on the comparison result of the first average value and the second average value.

7. The communication support method according to claim 6, wherein the computer compares the first average value and the second average value after a lapse of a prescribed time from a time of a shift to the holding state.

8. The communication support method according to claim 6, wherein the computer further
refers to the storing unit that further stores a specific expression which indicates a specific psychological state or a specific expression which is estimated to indicate a specific psychological state,
determines whether or not the specific expression is included in the utterance information of the first speaker in the holding state, and
outputs to the second terminal determination information on the psychological state of the first speaker based on the determination result of whether or not the specific expression is included.

9. The communication support method according to claim 8, wherein the computer outputs the determination information indicating that the first speaker is dissatisfied with the holding state, when the specific expression is determined to be included in the utterance information of the first speaker after a lapse of a prescribed time from a time of a shift to the holding state.

10. The communication support method according to claim 6, wherein the computer outputs to the second terminal the determination information on an action to be taken by the second speaker for the first speaker based on the utterance information of the first speaker.

* * * * *